United States Patent [19]

Bauer

[11] Patent Number: 5,664,128
[45] Date of Patent: Sep. 2, 1997

[54] OBJECT STORAGE APPARATUS FOR USE WITH DATA SETS IN COMPUTER APPLICATIONS

[75] Inventor: German Wolfgang Bauer, Cupertino, Calif.

[73] Assignee: Apple Computer, Inc., Cupertino, Calif.

[21] Appl. No.: 393,549

[22] Filed: Feb. 23, 1995

[51] Int. Cl.⁶ .................................................. G06F 3/00
[52] U.S. Cl. .......................... 345/334; 345/351; 345/342
[58] Field of Search ........................................ 395/155–161

[56] References Cited

U.S. PATENT DOCUMENTS

| | | | |
|---|---|---|---|
| 4,899,136 | 2/1990 | Beard et al. | 340/706 |
| 4,974,173 | 11/1990 | Stefik et al. | 364/521 |
| 5,202,828 | 4/1993 | Vertelney et al. | 364/419 |
| 5,295,242 | 3/1994 | Mashruwala et al. | 395/159 |
| 5,305,435 | 4/1994 | Bronson | 395/159 |
| 5,347,628 | 9/1994 | Brewe et al. | 395/159 |
| 5,404,442 | 4/1995 | Foster et al. | 395/159 |
| 5,432,934 | 7/1995 | Levin et al. | 395/650 |
| 5,488,686 | 1/1996 | Murphy et al. | 395/161 |
| 5,506,952 | 4/1996 | Choy et al. | 395/159 |
| 5,515,497 | 5/1996 | Itri et al. | 395/159 |

FOREIGN PATENT DOCUMENTS

WO94/29793  12/1994  WIPO ............................. G06F 9/44

OTHER PUBLICATIONS

Frank Ludolph et al., "Desk Drawer User Interface," U.S. Patent Application, S/N 08/090,470, filed Jul. 12, 1993.
Thomas J. Conrad et al., PCT Application entitled "Computer System with Graphical User Interface Including Drawer–Like Windows," Apple Ref. No. APPL206WO, filed with the PCT on Jun. 3, 1994 (Claiming priority of U.S. Application S/N 08/075,278, U.S. filing date Jun. 11, 1993) (Copy included herewith).

"SmartSuite strong, but not complete to launch SmartSuite 96 for Windows 95," PC Wekk, (30, Oct. 1995) p. 130.

"Novell, Lotus to Launch New Suites is test marketting PerfectOffice Select," Computer Reseller News, (4 Sep. 1995) p. 8.

Primary Examiner—Raymond J. Bayerl
Assistant Examiner—A. Katbab
Attorney, Agent, or Firm—Hickman Beyer & Weaver

[57] ABSTRACT

A drawer-like apparatus for storing objects for use with a data set in an application window on a digital computer. The drawer is advantageously associated with a user data set instead of with an application program or an application window. The drawer further includes a visible drawer handle displayed in the application window and a drawer storage area coupled to the visible drawer handle. Unless accessed via the visible drawer handle, at least a majority of the drawer storage area is visually hidden. The drawer storage area is capable of storing a plurality of objects, at least one of the plurality of objects stored within the drawer storage area is represented upon access by a symbolic representation within the drawer storage area. There are two types of drawers, default and customizable. Default drawers are read-only storage devices and store an unalterable number of default objects. On the other hand, customizable drawers have contents that may be changed and are generally used to store user-deposited objects. To control user access to the drawer, the association between the drawer and the data set is inhibitable based on a predetermined availability criteria. Further, each drawer may include a write-enable criteria, which determines whether that drawer is default or customizable to a particular user.

18 Claims, 20 Drawing Sheets

OBJECT STORAGE APPARATUS FOR USE WITH DATA SETS IN COMPUTER APPLICATIONS

BACKGROUND OF THE INVENTION

This invention relates generally to computer systems and to graphical user interfaces for computer systems. More particularly, the present invention relates to apparatus and methods for storing objects in a digital computer application window.

Application windows are often used with computer systems implementing graphical user interfaces (GUIs). Many people find that computers having GUIs are easier to learn and use than comparable computers without GUIs. Computers having GUIs include desktop units, such as the popular Apple™ Macintosh™ and IBM™-compatible computers, notebooks and subnotebooks, such as the popular Apple™ Powerbooks™ and IBM™ ThinkPads, as well as pen-based computers such as the Apple™ Newton™. For ease of understanding and without limiting the scope of the invention, a Power Macintosh™ computer system manufactured by Apple™ Computer Inc. of Cupertino, Calif. is selected for illustration purposes. However, it should be noted that the discussion below is equally applicable to computers of other makes and models.

The present invention is well suited for storing objects in an easily accessible manner in an application window. As the term is used herein, an object may represent a textual data object such as a block of alphanumeric or ideographic characters. An object may also represent a graphical data object such as a pixel dot, a circle, a line, or a group of graphical data objects that is designated for manipulation as one unit. Further, objects may also represent functions that implements a software "tool" for use in manipulating other objects. As is well known to those familiar with the object-oriented programming approach, objects may also contain both data and functions.

FIG. 1 shows a typical prior art GUI screen on a computer screen 10. Computer screen 10 represents the area within which images, texts, and other types of data objects can be displayed and manipulated. On an Apple Power Macintosh, computer screen 10 often includes a desktop image 14 which is produced by a Macintosh operating system. Desktop image 14 often includes a menu bar 18 and a desktop display area 20. Within desktop display area 20, shown are a number of icons 22, 24 and 26 representing different objects. For example, icon 22 represents a hard disk drive, icon 24 represents a "trash can" in which files can be deposited to be deleted, and icon 26 represents a folder entitled "desk stuff," which may contain application programs and files of various types.

Menu bar 18 preferably includes a number of menu labels 28, 30, and 32 for implementing menus, as are well known to Macintosh users. Desktop image 14 also includes a screen cursor shown in the form of an arrow 34. The screen cursor works in cooperation with a pointing device, for example, a trackball, a mouse, a joystick, special keys on a computer keyboard, or the like. As is well known to those of skill in the art, the screen cursor may be moved to different positions on computer screen 10 and may assume different forms.

There is also shown in FIG. 1 an application window 16 within desktop image 14. Application window 16 represents an instance of a utility program known as Finder™, also manufactured by Apple Computer, Inc. of Cupertino, Calif. At the top of window 16, shown is a title bar 36. As shown in FIG. 1, title bar 36 identifies the current window as "A Folder." Each window has associated with it a window display area 37 within which information from a data set associated with window 16 may be displayed and manipulated. For ease of manipulation of the data objects in the aforementioned data set, it is usually desirable to keep window display area 37 as large and as uncluttered as possible. Optional vertical scroll bar 38 and horizontal scroll bar 40 are preferably located at the vertical and horizontal edges of window 16. Window 16 can be moved around desktop display area 20, preferably by dragging on title bar 36. Window 16 can also be resized, preferably by dragging a size box 42 to expand or contract window 16. Further, window 16 can also be closed, preferably by clicking on a close box 44 in the upper left corner of window 16.

Windows sometimes include information regarding the software currently under use and the current system capacity. In FIG. 1, textual information box 46 in window 16 indicates that there is currently 0 item in "A Folder," 53.2 megabytes of total memory capacity on a disk storage device, of which 9.7 megabytes of memory is available. The functions and use of the aforementioned items, which are typical in a GUI environment, are well known to those familiar with the Apple™ Macintosh™.

For the purposes of the present invention, an application program is any computer program that utilizes GUI-based windows in the display and manipulation of data. As the term is used herein, application programs may include programs used to manipulate textual, graphical, or voice data, to perform system utilities, to facilitate electronic communication, or the like. An application window represents a visual representation of one instance of an application program that operates on a particular data set within a window. In a typical GUI environment, there are often multiple application windows simultaneously open on computer screen 10, each of which may be an instance of a particular application program.

FIG. 2 shows an application window 50 representing a typical graphics program used to create graphical as well as text data. Application window 50 is entitled "Main Window" as shown in title bar 36 of application window 50. Within window display area 37 of window 50, shown are a plurality of graphical data objects 54, 56, 58, and 60. Since application window 50 represents an instance of a graphics application program, the data set manipulated thereby is displayed primarily in the form of graphical data objects. It should be noted, however, that the data objects displayed in window display area 37 may also include texts, numbers, processes, and other forms of data representation.

Application window 50 further includes a plurality of tools from which the user may select to manipulate the data set associated with application window 50. For example, there is provided a tool, represented by icon 62, for rotating graphical data objects in window display area 37. Another tool, represented by icon 64, is provided for enlarging a graphical data object. As shown in FIG. 2, there are other tools having other functions displayed in window 50 that are available for selection by the user. As is well known to users of GUIs, when the icon representing a tool is selected, preferably by a process known as "clicking" with a mouse (wherein the button of the mouse is pressed once), the function associated with that tool becomes available to the user.

In a typical drawing program, such as MacDraw™ by Apple Computer, Inc. of Cupertino, Calif., there are numerous tools furnished for manipulating data. If possible, each tool is preferably represented visually in the application window by a unique icon. This is because in GUIs, the user gain access to the function of a tool primarily by selecting, with a pointing device, the icon representing the tool. However, when icons representing tools are displayed, they take up space and consequently cause the window display area to be diminished. In some programs, there is often insufficient space in the application window to display all furnished icons. To solve the dilemma, users of GUIs often keep only a small set of often-used icons in the application window. The remainder are kept off the application window, incapable of being conveniently accessed.

In the prior art, a variety of techniques have been attempted to make more of the icons accessible to the user at any given time without diminishing the window display area. One technique involves the use of menus, also known as pop up or pull down menus. Each menu contains a group of tools whose symbolic representations are logically grouped together according to functionality. Every application window, regardless of its data set, contains an identical set of menus. The use of menus are familiar to users of GUIs.

However, menus are inflexible because the user cannot conveniently associate a particular set of menus with a particular data set. Such inflexibility makes the application program less user-friendly because different users of the same application program may have different needs. Even if there is only one user, that user may desire to use different sets of tools with different sets of data.

Furthermore, menus are read-only storage mechanism. There are times when a user may wish to store data objects instead of tools in a storage mechanism for later use. For example, a chemist writing a laboratory report may wish to store a list of often-used but complex chemical formulas in a storage mechanism that can be conveniently accessed for later use. As a further example, a graphic illustrator may wish to store a set of often-used graphical data objects for later access and use. Menus cannot be conveniently written into to accommodate the user's storage needs.

Further, the prior art menus are also inflexible with regard to the arrangement of their menu labels in the application window. In many prior art computer programs, there is a fixed number of menu labels, each of which is constant in size and displayed in an unalterable arrangement in the application window. There is no way to flexibly and easily modify the size of the menu labels or rearrange them in order to further maximize the window display area.

Others have also attempted to address the above problems using a variety of apparatus and methods.

U.S. Pat. No. 5,305,435 to Bronson discloses a novel computer interface which stimulates familiar document handling activities based upon a unique display metaphor representative of a standard office filing system and work area of a desk. The display system includes multi-windows which are displayed in a central screen area designated for just active computer windows. The interface further includes designating the edge areas of the screen for displaying window tabs of inactive windows. The window tabs are arranged in a way to simulate an integrated filing system, and to provide a convenient method of organizing and viewing computer files.

U.S. Pat. No. 5,202,828 to Vertelney et al. discloses an interface element having a plurality of user interface elements for marking, finding, organizing, and processing data within documents stored in an associated computer system. Each element typically has an appearance which is uniquely related to the data or the function the element is designed to represent or perform, respectively. In their simplest form, these elements are only used to mark data within a document. Each element, however, can also be programmed to cause the computer to perform some function in association with the marked data, such as printing the data or mailing the data to someone. A user can select particular data within a document using an element and have that data associated with the element in memory. Data marked with common elements can be found by searching for a particular representative element in memory. Users can create their own elements with their own desired functionality, and modify existing elements. Elements can also be compounded together so as to cause a combination of tasks to be performed by simply activating one element.

U.S. Pat. No. 4,899,136 to Beard et at. discloses a multiprocessor system comprising concurrent display of video data reflecting the operation of two processors in discrete portions of a single display screen with a user interface adapted for interaction with both processors. One processor controls the entire display while allocating a portion of the display screen for the use of the other processor which processor emulates a target processor system, for example, the IBM PC. A user interface is represented on the display screen in the form of metaphoric objects, called icons, with which the user can interact by changing the input focus to a designated object by visually pointed to it via the input means, which thereafter permits manipulation of the designated object or interaction with data input/output relative to the designated object. This input means is also used to initially change the input focus to either the allocated emulating processor screen portion or to the remaining portion of the central processor display screen prior to interaction with the metaphoric objects in a selected screen portion, the change of the input focus causing subsequent user input via the input means to be directed to the selected screen portion until interrupted by a change in focus input to the other of the screen portions by the user via the input means. An icon may be a representation of a virtual object, such as a virtual floppy disk, that is accessible in either the host system world or in the emulating processor world even through the virtual floppy disk may have a filing system alien to the host system world.

Commonly assigned U.S. patent application Ser. No. 08/090,470, filed Jul. 12, 1993 by Ludolph et al., discloses a display oriented software user interface for the generation and display of a secondary display region within a primary display region of a computer controlled information management system having windows or localized sections of displayable information and icons. The secondary display region, Desk Drawer, providing advanced capabilities to the management system by generating a readily accessible region wherein icons may be placed and always accessed thereafter when the secondary display region is present. The presence of the secondary display region may be governed by a separate screen region responsive to the cursor display position. The Ludolph et al. application is assigned at the time of invention to the Assignee of the present invention and is currently owned by the same Assignee.

Commonly assigned U.S. patent application Ser. No. 08/075,278, filed Jun. 11, 1993 by Conrad et al., discloses a window management mechanism which allows a user to open a window as a drawer or, perhaps more appropriately named, a pop-up window. The drawer is an opened window that a user has dragged down to a drawer region at the bottom of the screen such that only the title bar or some drawer handle illustration is left showing. When the user does this, the window remains open but is kept off screen. The user may momentarily pop the window back onto the screen by clicking on the window title bar or drawer handle, or by dragging the cursor into the window icon during a drag. The window stays on screen as long as no other windows are selected. As soon as a user selects another window, or opens a file with a double click within the drawer, the window slides back off screen. This allows the user to set up easy access windows. Another feature of a drawer window allows the user to open them during a drag. To do so, the user drags an object or the cursor into the drawer window that is desired to be opened. When the cursor touches the bottom of the screen, or an area within a threshold of the bottom of the screen, the drawer window slides open a notch at a time. As long as the user pushes against the bottom or remains in this threshold region, the drawer slides open. The Conrad et al. application is assigned at the time of invention to the Assignee of the present invention and is currently owned by the same Assignee.

Although the aforementioned applications and patents address some aspects of the problems associated with the storage of objects in an application window, difficulties remain. Consequently, there exists a need for improved apparatus and methods for efficiently storing objects in an application window.

SUMMARY OF THE INVENTION

The invention relates to an apparatus for storing objects for use with a data set in an application window on a digital computer, including a drawer associated with the data set. In one aspect of the invention, the drawer is advantageously associated with a user data set instead of with an application program or an application window. The drawer further includes a visible drawer handle displayed in the application window, and a drawer storage area coupled to the visible drawer handle. In the preferred embodiment, at least a majority of the drawer storage area is visually hidden unless accessed via the visible drawer handle. Further, the drawer storage area is capable of storing a plurality of objects, at least one of the plurality of objects stored within the drawer storage area is represented upon access by a symbolic representation within the drawer storage area.

In another aspect of the invention, the association between the drawer and the data set is inhibitable based on a predetermined availability criteria. Depending on the relationship between the predetermined availability criteria and a user's authority level, a user may associate a particular drawer with his or her data set for use in manipulating data. In the preferred embodiment, one of the plurality of objects stored by the drawer is a user-deposited object, the user-deposited object being an object chosen for storage by a user of the application window, and the drawer is a customizable drawer capable of storing the user-deposited object.

In yet another aspect of the invention, the customizable drawer automatically opens for access when the object selected for storage is dragged over the visible drawer handle. Further, the drawer automatically closes when the boundary of one of a screen pointer and the symbolic representation is moved outside a boundary area of the customizable drawer. Alternatively, the drawer automatically closes after the object chosen for storage is deposited in the customizable drawer of the application window.

In yet another aspect of the invention, the width of the drawer handle is user-modifiable. Further, the width of the drawer storage area correspondingly and automatically changes responsive to a modification of the width of the drawer handle.

In yet another aspect of the invention, the drawer handles in an application window may be displayed in a stacked format to maximize the window display area. Alternatively, the drawer handles in an application window may be displayed in a scrolled format, thereby maximizing the window display area.

These and other features of the present invention will be presented in more detail in the following specification of the invention, the figures, and the appended claims.

DESCRIPTION OF THE PREFERRED EMBODIMENT

Physical Embodiment

It should be noted that the invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, windows, drawers, objects or the like. It should be remembered, however, that all of these and similar terms are to be associated with the appropriate physical quantities and are merely convenient labels applied to these quantities.

Further, the manipulations performed are often referred to in terms, such as identifying, selecting, dragging, or dropping. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates, in part, to method steps for operating a computer in processing electrical or other physical signals or quantities to generate other desired physical signals or quantities.

The present invention also relates to an apparatus for performing these operations. This apparatus may be specially constructed for the required purposes, or it may be a general purpose computer selectively activated or reconfigured by a computer program stored in the computer. Although a particular computer may be selected for illustration purpose, the processes presented herein are not inherently related to any particular computer or other apparatus. In particular, various general purpose machines may be used with programs written in accordance with the teachings herein, or a more specialized apparatus may be used to perform the required method steps. The required structure for a variety of these machines will appear from the description given below.

Architecture and Operation of the Apparatus and Method

Figure 3:
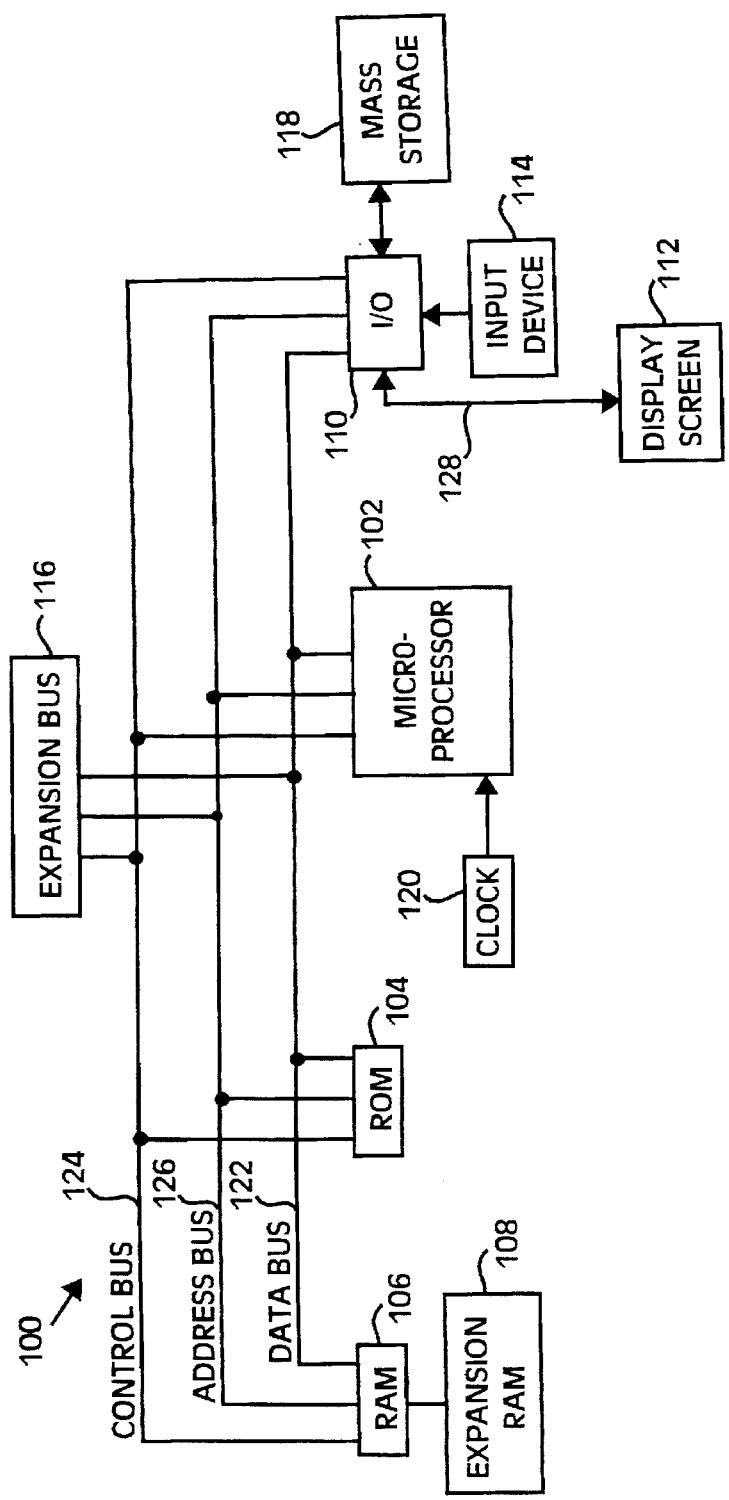
FIG. 3 shows in a simplified diagram a computer system for implementing the present invention.

FIG. 3 shows a general purpose computer system for implementing the present inventive method. Referring to FIG. 3, a computer system 100 in accordance with the present invention includes a central processing unit (CPU) 102, read only memory (ROM) 104, random access memory (RAM) 106, expansion RAM 108, input/output (I/O) circuitry 110, display assembly 112, input device 114, and expansion bus 116. Computer system 100 may also optionally include a mass storage unit 118 such as a disk drive unit or nonvolatile memory such as flash memory and a real-time clock 120.

CPU 102 is preferably a commercially available, single chip microprocessor such as one of the Intel X86 or Motorola 680XX family of chips, and is preferably a reduced instruction set computer (RISC) chip such as the PowerPC microprocessor available from Motorola, Inc. CPU 102 is coupled to ROM 104 by a data bus 122, control bus 124, and address bus 126. ROM 104 contains the basic operating system for the computer system 100. CPU 102 is also connected to RAM 106 by busses 122, 124, and 126 to permit the use of RAM 106 as scratch pad memory. Expansion RAM 108 is optionally coupled to RAM 106 for use by CPU 102. CPU 102 is also coupled to the I/O circuitry 110 by data bus 122, control bus 124, and address bus 126 to permit data transfers with peripheral devices.

I/O circuitry 110 typically includes a number of latches, registers and direct memory access (DMA) controllers. The purpose of I/O circuitry 110 is to provide an interface between CPU 102 and such peripheral devices as display assembly 112, input device 114, and mass storage 118.

Display assembly 112 of computer system 100 is an output device. In the case of certain computers, such as the Apple™ Newton™, display assembly 112 also serves as a part of the input device. When operating as an input device, a position-sensing apparatus disposed on the surface of display assembly 112 works in cooperation with input device 114 to receive data input from the user. Accordingly, it is coupled to I/O circuitry 112 by a data bus 128. When operating as an output device, the display assembly 112 receives data from I/O circuitry 110 via bus 128 and displays that data on a suitable screen. Note that unless display assembly 112 serves an input function, it is not absolutely necessary that data bus 128 be bi-directional.

The screen for display assembly 112 can be a device that uses a cathode-ray tube (CRT), liquid crystal display (LCD), or the like, of the types commercially available from a variety of manufacturers. Input device 114 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for entering data and/or pointing to a particular location on a screen of a computer display. The aforementioned input devices are available from a variety of vendors and are well known in the art.

Some type of mass storage 118 is generally considered desirable. However, mass storage 118 can be eliminated by providing a sufficient amount of RAM 106 and expansion RAM 108 to store user application programs and data. In that case, RAMs 106 and 108 can optionally be provided with a backup battery to prevent the loss of data even when computer system 100 is turned off. However, it is generally desirable to have some type of long term mass storage 118 such as a commercially available hard disk drive, nonvolatile memory such as flash memory, battery backed RAM, PC-data cards, or the like.

In operation, information is inputted into the computer system 100 by typing on a keyboard, manipulating a mouse or trackball, or "writing" on a tablet or on position-sensing screen of display assembly 112. CPU 102 then processes the data under control of an operating system and an application program stored in ROM 104 and/or RAM 16. CPU 102 then typically produces data which is outputted to the display assembly 112 to produce appropriate images on its screen.

Expansion bus 116 is coupled to data bus 122, control bus 124, and address bus 126. Expansion bus 116 provides extra ports to couple devices such as modems, display switches, microphones, speakers, etc. to CPU 102.

Figure 1:
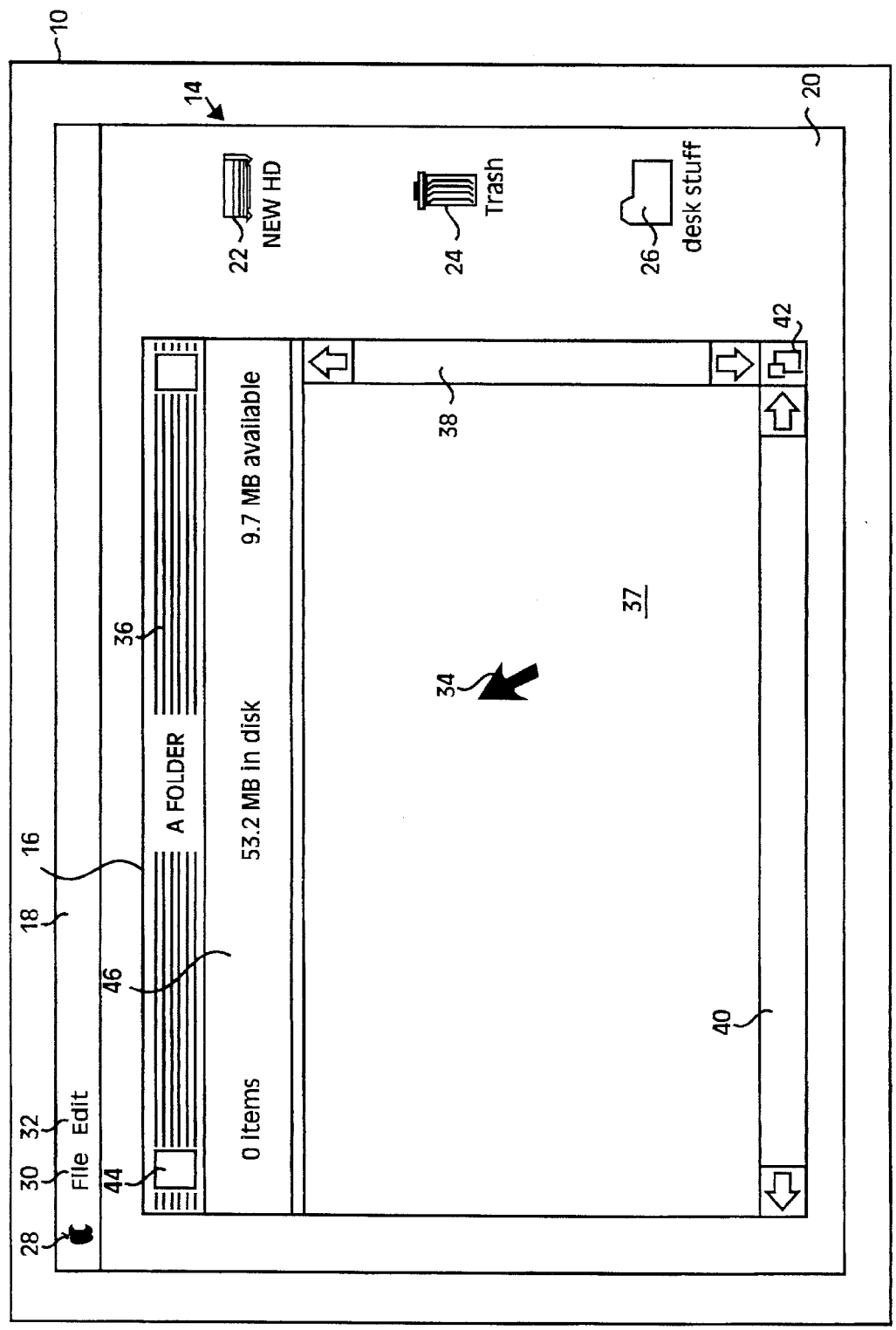
FIG. 1 shows in a simplified format a typical prior art GUI screen.
Figure 2:
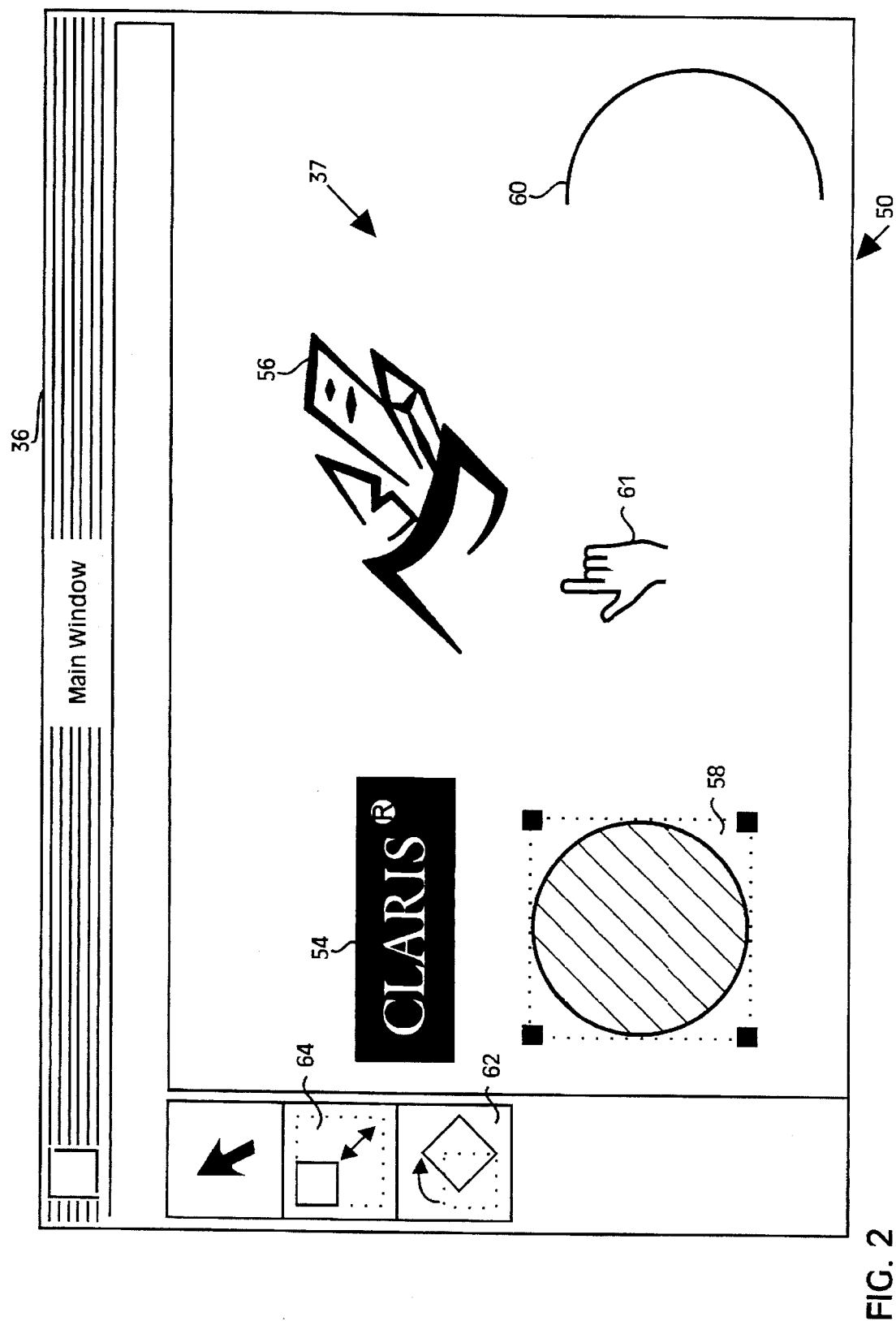
FIG. 2 shows in a simplified format an application window representing a typical graphics program for creating graphic and text data.
Figure 4:
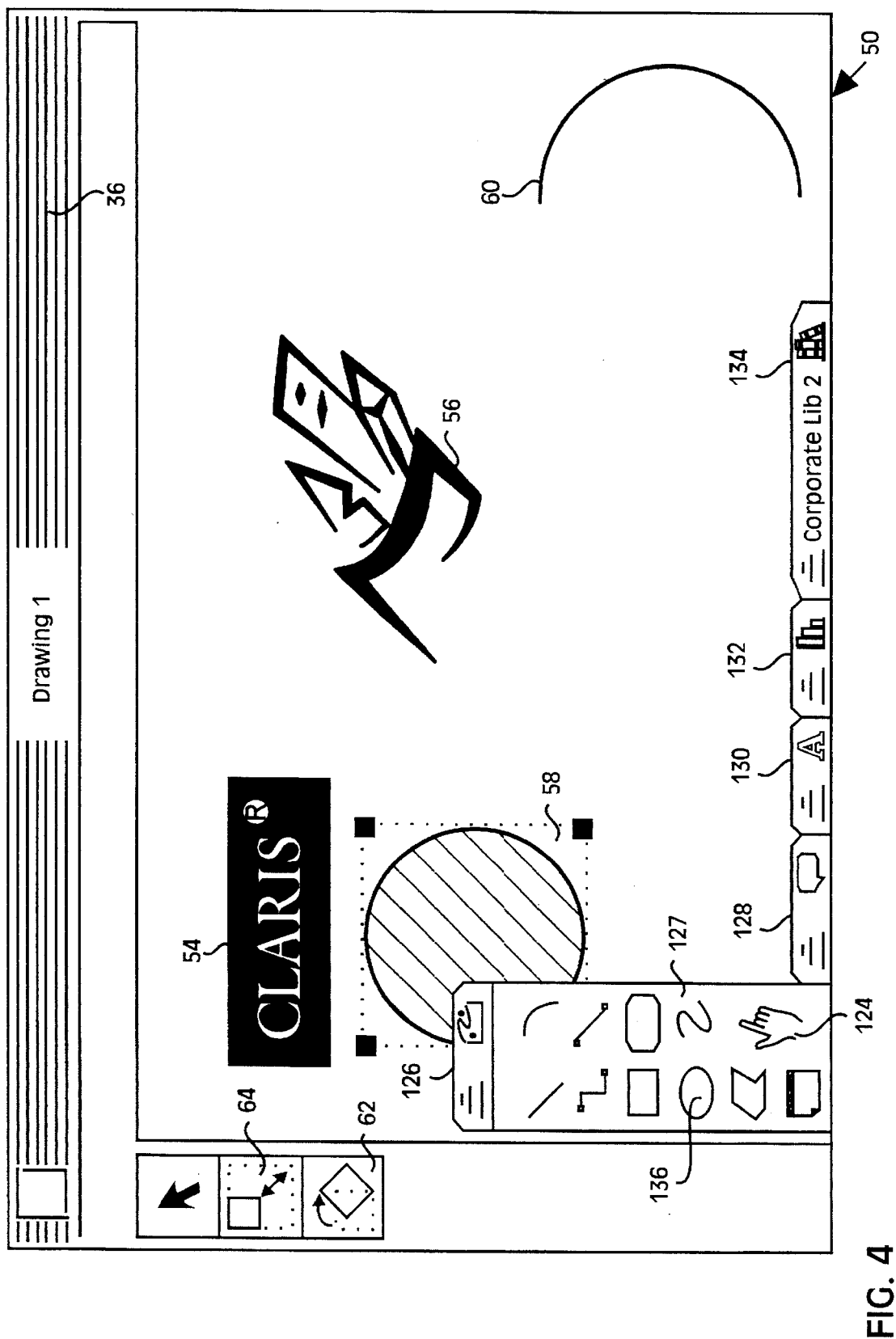
FIG. 4 shows in a simplified format the application window of FIG. 2 further including the drawer handles of the present invention.

FIG. 4 shows in a simplified format the application window 50 of FIG. 2, further including the drawer handles of the present invention. At the bottom of application window 50, there is shown a plurality of drawer handles 126, 128, 130, 132, and 134. Each of the drawer handles signify to the user that there exists a storage mechanism, or "drawer," available for use. Each drawer is associated with one of drawer handles 126, 128, 130, 132, or 134, and is capable of storing a plurality of objects. The objects in turn are accessible for highlighting or selecting by the user via the drawer handle.

An object is said to be highlighted when a user places a screen pointer proximate to or on the object to be highlighted and execute a highlight function, preferably by depressing a mouse button and keeping the mouse button depressed. Highlighted objects are preferably displayed in a different display mode, e.g. highlighted or reverse video, to signify their highlighted state. When an object is a large block of text in a page or a group of graphical objects, highlighting may be done by "blocking," e.g., highlighting the particular words or graphical objects to be selected. Alternatively, highlighting may be performed by "lassoing" or similar techniques known in the art. To terminate the highlighting operation, the user preferably releases pressure on the depressed mouse button.

Highlighting is useful when performing certain operations such as dragging. In one embodiment, the user drags an object from one location to a destination location on the display screen preferably by first highlighting the object to be dragged. While the button is depressed, the user then preferably maneuvers the pointing device to move the screen pointer to a destination position. The dragged object is preferably coupled to the screen pointer during a drag operation and moved to the destination position along with the screen pointer. To terminate the drag, the user preferably terminates the highlighting operation. At the end of a dragging operation, the dragged object is said to be dropped at the destination position.

An object is said to be selected when the user places the screen pointer proximate to or on the object to be selected and execute a selection function, preferably by clicking once on a mouse button. Selected objects are preferably displayed in a different display mode, e.g. highlighted or reverse video, to signify their selected state. To deselect a previously selected object, the user preferably places the screen pointer proximate to or on the previously selected object and execute a deselect function, preferably by clicking a mouse button once again.

When an object contains executable functions, the functions associated with that object may be executed by an activating operation. To activate an object, the user preferably places the screen pointer proximate to or on the object to be activated and execute an activate function, preferably by double-clicking on a mouse button. It should be noted that although the above operations have been described with reference to a mouse, such operations may be executed using other types of pointing devices and employing other manipulation techniques.

FIG. 4 also shows the drawer associated with drawer handle 126 being opened. Drawers are normally closed unless accessed by the user via a drawer handle. The drawer associated with drawer handle 126 includes a drawer storage area 127, which is typically coupled to drawer handle 126. In the drawing of FIG. 4, drawer handle 126 is shown to be physically contiguous with, or appears physically connected to, drawer storage area 127 when the drawer opens. However, such is not a necessity. A drawer storage area of the present invention may be logically coupled to its drawer handle without being physically contiguous therewith when opened.

Each of the symbolic representations inside drawer storage area 127 represents a stored object. For simplicity sake, the symbolic representations may be predefined and made uniform for data objects of all types. Alternatively, there may be a plurality of predefined symbolic representations, each representing a particular type of data object. For example, there may be a symbolic representation for all stored textual data objects and another symbolic representation for all stored graphical data objects. More preferably, each symbolic representation representing a particular stored object is made unique. In particular, it is preferable that each unique symbolic representation renders the stored object represented by it easily recognizable to the user. In one embodiment, a symbolic representation for a graphical data object is preferably a reduced copy of that graphical data object. Using appropriate image processing techniques, the symbolic representation preferably retains the general shape, color, or texture of the original graphical data object to be stored. In this manner, the symbolic representation for a red rectangle may readily be distinguished by the user from the symbolic representation for a blue circle.

In one embodiment, an object stored in a drawer may be associated with textual, graphical, numerical, or other types of "labels," which may be displayed in a status area of an application window, e.g. at the bottom of an application window, when that object is "touched" by the screen pointer. To further aid in the identification, these labels may represent names, descriptions, annotations, samples, previews, and the like, associated with the stored object. In this manner, the user may readily identify the stored object that is being touched by the screen pointer from the label displayed in the status area of the application window.

As a further embodiment, a block of text is preferably reduced such that certain formatting characteristics, such as the number of paragraphs in the block of text or the margin of the text, remain recognizable in its symbolic representation. If there are multiple textual objects to be stored, each object may be reduced by the same fixed ratio such that a user can still identify, by looking at the relative sizes of the symbolic representations, which of the symbolic representations represent a particular block of text. In this manner, a symbolic representation serves both to facilitate user access and to uniquely identify the stored object.

The drawer storage area that is coupled to a drawer handle is preferably visually hidden unless accessed. During the normal execution of the application program, only the drawer handles are visible unless the drawer associated with that drawer handle is accessed. For example, the drawer storage area coupled to drawer handles 128, 130, 132, and 134 are not visually presented in application window 100 when the drawers associated with those drawer handles are not accessed. In one embodiment, however, some small portion of the drawer storage area may remain visible even when the drawer is "closed," thereby permitting the user to determine at a glance whether that drawer contains any stored objects. In any event, it is preferable that when a drawer is "closed," at least a majority of the drawer storage area is made invisible. To further identify the contents of the drawers, each drawer handle preferably has textual, graphical, numerical, or other types of information displayed on it to identify the contents and the number of objects stored therein.

When the drawer associated with a drawer handle opens, i.e., the drawer is accessed via its drawer handle, the entire drawer, including the drawer storage area and the drawer handle, preferably slides or springs open as one unit from the window region occupied by the drawer handle prior to access. The user, if properly authorized, preferably can adjust the slide rate to suit individual preference. For example, a user may prefer that a drawer "snaps" open and adjust the slide rate accordingly while another user may prefer that a drawer gently glides to an open position. During access, the entire drawer, including the drawer handle, the drawer storage area, and at least some of the symbolic representations therein, becomes visible to the user. In one embodiment, each drawer have associated with it a drawer storage area of a predefined size. If there are more symbolic representations than can be displayed in the drawer storage area, a scroll bar is preferably provided. When access ends, the drawer preferably slides or snaps to a closed state, depending on the preset slide rate, again rendering at least a majority of its drawer storage area invisible to the user.

Each drawer handle preferably can be labeled by the user with appropriate text and graphics that adequately identify the drawer and its contents. For example, drawer handle 130 shows thereon the letter "A," indicating that drawer 130 contains mostly texts. Drawer handle 132 on the other hand shows a graphical symbol for plots, indicating that drawer 132 contains, for example, mostly tools for plotting data. Note that although it is preferable that a drawer contains like data objects, e.g., tools, texts, graphics, or the like, such is not a requirement of the present invention. If necessary, different types of data objects may be stored in a single drawer. Further, although FIG. 4 shows only five drawer handles, it should be noted that a greater or fewer number of drawers may be present in any application window. As shown in FIG. 4, the drawer handles are preferably placed adjacent to the outer boundary of application window 100 and efficiently grouped in order to further maximize the window display space.

Drawer handle 134 represents a drawer handle to a customizable drawer. A customizable drawer is distinguishable from a default drawer in that a customizable drawer may contain user-deposited objects, i.e. objects that are dragged and dropped by the user into the drawer storage area for storage. Because a customizable drawer can accept user-deposited objects for storage, its contents may change. A customizable drawer also permits a stored object within its drawer storage area to be removed therefrom or deleted, resulting in a reduction in the number of stored objects. In this manner, a customizable drawer may be thought of as a storage mechanism capable of both read and write.

In contrast, a default drawer has a fixed number of stored objects. The contents of default drawers are preferably unalterable. Default drawers are often supplied with the original application program or by a third party vendor or may be a customizable drawer which has been designated default by a user. Default drawers may be thought of as write-only storage mechanisms.

As mentioned earlier, drawers which are otherwise customizable may advantageously be designated default for a certain users. On the other hand, drawers which are otherwise default may be designated customizable for certain users. In this manner, the present invention advantageously permits the sharing of drawers among many users in a network or a multi-user environment while retaining the ability to flexibly inhibits some users from writing into some drawers.

In one embodiment, each drawer has associated with it a write-enable level variable. This write-enable level variable is compared to an authority level assigned to each user. If the user's authority level equals or exceeds the drawer's write-enable level, that user may write into the drawer, i.e. that drawer is customizable to that user. On the other hand, if the user's authority level is below the drawer's write-enable level, that user may not write into the drawer, i.e. that drawer is always default to that user. By setting the write-enable level of a drawer exceedingly low or high, a drawer may be made respectively always customizable or default to every user.

As an example, a drawer in a spreadsheet application window may contain complex formulas and tables for calculating individual income tax. If those formulas and tables are to be relied on, it may be advantageously to designate that drawer default, i.e. read-only, to everyone but a handful of authorized expert accountants. To those authorized expert accountants, that drawer is customizable, and the authorized expert accountants may change the formulas and tables as tax laws change. Other users may still have access to those drawers, and consequently access to the data and tools stored therein. However, those drawers are default from their perspective, and they cannot alter the contents of those drawers.

Furthermore, certain drawers may be made completely unavailable to some users. For security reasons, it may be desirable to exclude certain users from accessing information and tools stored in some drawers, whether to read or to write. For those excluded users, the drawer handles associated with the unavailable drawers are preferably never displayed in their application window. In this manner, the present invention flexibly permits the sharing of data and drawers in a network or other multi-user environments while retaining the ability to compartmentalize data and keep certain drawers and data from being accessed by certain users.

In one embodiment, each drawer has associated with it an availability criteria variable. This availability criteria variable is compared to the authority level assigned to a user. If the user's authority level equals or exceeds the drawer's availability criteria variable, that user may use that drawer, i.e. associate that drawer with the user's data set. Note that whether the drawer is default or customizable to that user still depends on the relationship between the user's authority level and the drawer's write-enable level. On the other hand, if the user's authority level is below the drawer's availability criteria variable, that user may not use that drawer, i.e. the association between that user's data set and that drawer is inhibited. By setting the availability criteria variable of a drawer exceedingly low or high, a drawer may be made respectively always associable or never associable to every user.

In another aspect of the present invention, a user can advantageously associate specific drawers with a specific data set. If the application program is instantiated by a user without a particular data set, e.g. the user opens a new application window, the new application window preferably opens with a predefined set of drawers that is typically associated with the null data set. Alternatively, the user may preset the application program such that the predefined set of drawers that is associated with a null date set is also zero. Additional drawers, either default or customizable, can be added to an application window as necessary. Adding an application drawers involves selecting the drawer from a list of available drawers. The list of available drawers may exist either in a menu or in a specialized drawer.

When the application window closes, the drawers present in the application window at the time of closing are preferably associated with the application window data set so that when that data set is activated again, the same drawers are displayed. The fact that the drawers are associated with a particular data set instead of with an application program greatly improves usability. Because each application window of an application program may have associated with it a unique set of drawers, it is possible to preset the application program such that, for example, when a person in the art department of a company instantiate a drawing application program, that person may have access to a given set of drawers. The same application program instantiated by someone in the technical writing department may, for example, yield an application window with an entirely different set of drawers. The novel association feature can also be used by a user or a system administrator in a multi-user environment to prevent certain users from ever associating a given drawer with their data sets while still permitting those users to make use of other features of the application program.

Figure 5:
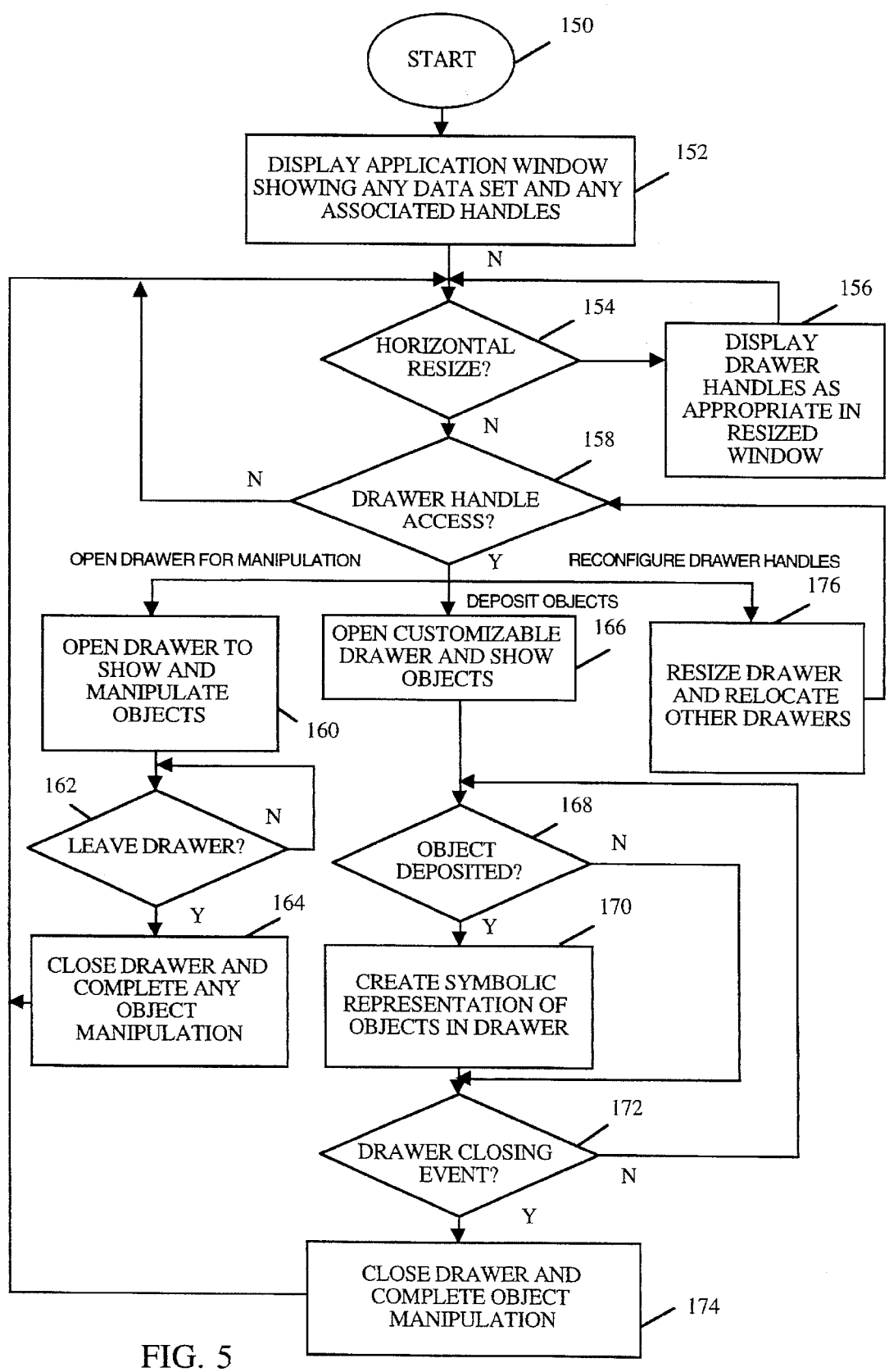
FIG. 5 shows in a simplified flowchart format the overall flowchart of the present inventive method.

FIG. 5 shows in a simplified flowchart format the overall flowchart of the inventive method. Referring to FIG. 5, shown is a step 150 representing the activation of an application window via, for example, double-clicking on an application program icon on the computer desktop image. After the application window is activated, an application window is displayed, along with any existing data set and any associated drawer handles in step 152. After the application window, the data set, and any associated drawer handles are displayed, the program enters its normal operating mode at step N. During normal operation at step N, the user may manipulate the data objects in the data set. The program also checks during normal operation at step N to determine whether the user desires to resize the application window, which may necessitate the rearrangement of the displayed drawer handles. The user may wish to resize an application window by shrinking its width, for example. When an application window is resized, it may be necessary to rearrange the drawer handles to keep all drawer handles visible in the newly resized application window.

If a horizontal resizing operation is detected in step 154, e.g. by detecting the manipulation of the application window's size box, the program proceeds to step 156 where it performs any necessary resize operation and displays the resized application window and its drawer handles as appropriate. Thereafter, the program returns to its normal operating mode in step N. On the other hand, if horizontal resize is not desired, the program further checks in step 158 to see whether any of the drawer handles are accessed. Depending on how the drawer handles are accessed, the program determines whether the user wants to open a drawer for manipulation of the objects therein, deposit user-deposited objects into a customizable drawer, or configure the drawer handles.

If the user desires to access a drawer for manipulation of the stored objects, the user preferably selects the corresponding drawer handle to open the drawer. After a drawer handle is selected, the program proceeds to step 160 where it opens the drawer, i.e. displays the drawer storage area to show the symbolic representations of the objects stored to make those stored objects available for manipulation by the user.

Manipulation operations include selecting, for example clicking as defined previously, on a tool object symbolic representation to make use of the tool functionality. Manipulation operations may also include dragging either the stored object or a copy of the stored object out of the drawer into, for example, the window display area. If the open drawer is a default drawer, objects stored therein cannot be removed by a dragging operation. Consequently, only a copy of the stored object, and not the stored object itself, may be dragged out of an open default drawer at step 160. On the other hand, either the stored object itself or its copy may be dragged from a customizable drawer. The user input sequence indicating a "drag a copy of the stored object" operation is preferably different from the user input sequence indicating a "drag the stored object" operation.

After manipulation, the program then checks to see whether the user desires to leave the drawer in step 162. In step 162, the user preferably indicates her desire to leave the drawer area by moving the screen pointer outside of the boundary of the drawer. As long as the screen pointer remains inside the boundary of the drawer, the drawer remains open. On the other hand, if the screen pointer is moved outside the boundary of the drawer area, the program proceeds to step 164 to close the drawer. Alternatively, the drawer may be closed by selecting the open drawer handle, a designated portion of the open drawer handle, or by a sequence of keystrokes on the keyboard.

As discussed earlier, when a drawer is closed, it is preferable that neither the drawer storage area nor the symbolic representations representing the stored objects are made visible. It should be noted that it some cases, it may be advantageous to designate that drawers should close only partially, e.g. the majority but not all of the drawer storage area should be made invisible. In this manner, it is possible to determine at a glance whether a "closed" drawer has any objects stored therein. In any event, the drawer handle is preferably returned to the closed position, whether fully or partially, to maximize the window display area.

The program further proceeds to step 164 to complete any remaining object manipulations. For example, the stored object accessed in step 160 may have been an often-used contract provision that the user wishes to insert in a specific place in the document currently displayed in the window display area. Subsequent to the closing of the drawer in step 164, the user may drag the symbolic representation for the stored text object to the desired destination in the window display area and drops. The program then recreates the text object and inserts it into the location occupied by the screen pointer when the symbolic representation is dropped. After all object manipulations in step 164 are completed, the program returns to step N to resume normal operation.

To store an object, the user preferably drags the object to be stored over a customizable drawer handle. When the object to be stored is dragged over a drawer handle of a customizable drawer, step 158 determines that the mode of handle access is deposit and passes control to step 166 where the customizable drawer opens. Note that the drawer opens only if it is one of the customizable drawers. If the object to be deposited is dragged over a drawer handle of a default drawer, it is preferable that the default drawer does not open.

In certain programs, a simplified outline may be created for a complex object during a drag operation to advantageously reduce the number of pixel updates that need to be made along the drag path. An object is said to be dragged over a drawer handle if its boundary, or the boundary of its simplified outline, overlaps the drawer handle.

When a customizable drawer is open in step 166 to receive user-deposited objects, the entire drawer, including the symbolic representation of any object already stored therein, is preferably displayed. In step 168, the program checks to see whether the object that was dragged into the open drawer has been deposited or dropped. If the program determines that the dragged object to be stored is dropped in step 168, the program proceeds to step 170 where it creates a symbolic representation of the object to be stored and displays that symbolic representation in the drawer storage area of the open drawer. In one embodiment, the drawer preferably closes automatically, either immediately or within a short time period sufficient for the user to visually confirm that a symbolic representation has been created for the stored object, after the dragged object is dropped in step 170. This unique feature advantageously improves usability and efficiency since the user does not have to click or even move the screen pointer after dropping the dragged object in order to close the open drawer and restore the window display area to its pre-handle access condition. Alternatively, the program may determine whether a drawer closing event has occurred at step 172 by checking whether the screen pointer has left the boundary of the open drawer. If the screen pointer leaves the boundary of the open drawer, the open drawer preferably automatically slides or snaps to a closed position.

In any event, the program next proceeds to step 174 to complete any remaining object manipulations. For example, the user may have deposited an object into a customizable drawer and selects a previously stored object for use prior to leaving of the open customizable drawer. In this situation, the program permits the user to complete any necessary manipulations with the object selected prior to returning to step N to resume normal operation.

Note that if the dragged object is not dropped into an open customizable drawer, the program then checks in step 172 whether the screen pointer has left the drawer boundary in step 172. If the screen pointer remains within the boundary of the open customizable drawer, the program returns to step 168, keeping the drawer open. On the other hand, if the dragged object is not dropped in step 168 and the user subsequently creates a drawer closing event by leaving the boundary of the open drawer, the program proceeds to step 174 to close the drawer and completes any remaining object manipulations. This situation occurs when, for example, a user initially wishes to drag an object into a customizable drawer for deposit but subsequently changes her mind prior to dropping the object.

If the screen pointer is placed in between two drawer handles at step 158, the program assumes that the user wants to configure the drawer handles and proceeds to step 176 where it configures the drawer handles in the application window. This configure drawer handles option is highly advantageous because it permits the user to rearrange the elements of the application window to achieve greater efficiency. For example, the user may wish to reduce the width of a certain drawer handle in order to place more drawer handles into an application window.

In some instances, the user may wish to expand drawer handles. In one embodiment, the drawer storage area is not fixed. As a customizable drawer storage area expands to accommodate additional stored objects, the drawer length may become unwieldy. In this case, the user may wish enlarge the drawer width, thereby reducing its length to obtain a more proportionate drawer. Further, the configure option permits the user to configure the drawers themselves, e.g., adding scroll bars to a drawer storage area of a specific drawer.

In one embodiment, the configure drawer handle option preferably permits the user to configure, e.g. resize, the drawer handle that is immediately to the left of the screen pointer position when that screen pointer is placed in between two drawer handles. When a drawer handle is resized, i.e. its width is adjusted, all the drawer handles to the left of the resized drawer handle preferably stay unchanged. The drawer handles to the right of the resized drawer handle is preferably shifted as appropriate to accommodate the resized drawer handle.

More importantly, when there are more drawer handles than can be fitted in a row or a column along an edge of an application window, the user may specify, via a preference setting in a menu for example, that the drawer handles be stacked or rearranged to maximize the window display area. This feature is important because while it is possible to consolidate the contents of various customizable drawers to reduce the number of customizable drawer handles in an application window, the user must make room for and display any default drawer handle that the user wishes to access. This is because default drawers and their contents are, by definition, unchangeable. In an application window that uses a large number of default drawers, this feature is therefore highly advantageous.

When stacked, drawer handles are preferably displayed sequentially in a row along the application window bottom edge. When that row is filled up, another row begins on top of the first row and so on. As an alternative, there may be provided a scroll bar permitting the user to scroll through all the available drawer handles without having to display all the drawer handles at once in a window.

Figure 6:
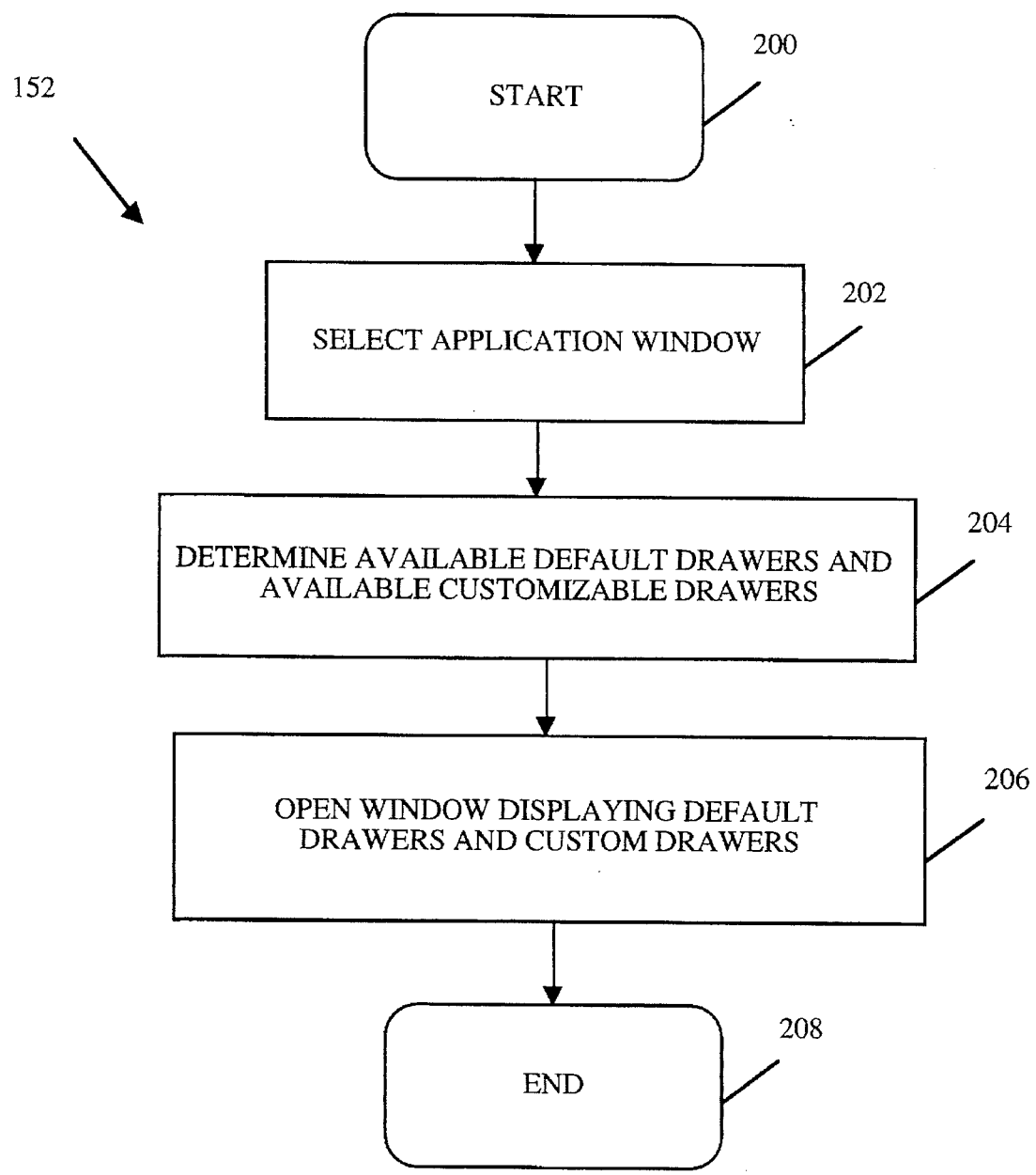
FIG. 6 shows in simplified flowchart format the steps taken by the method of the present invention to display an application window showing a data set and any associated drawer handles.

FIG. 6 shows in simplified flowchart format the steps taken by the method of the present invention to display an application window showing any data set and any associated drawer handles. FIG. 6 is essentially a more detailed flowchart explaining step 152 of FIG. 5. The steps of FIG. 6 starts at step 200. At step 202, an application window is selected and activated. At step 204, the program determines the available default drawers and customizable drawers that can be displayed in the application window that was activated in step 202. As discussed earlier, the set of default and customizable drawers furnished depends on the status of a particular user, whether the application window operates on a new or existing data set, and other factors. The program then proceeds to step 206 to actually open the application window that was activated in step 202 and to display the appropriate default and customizable drawers. The steps of FIG. 6 end at step 208.

Figure 7:
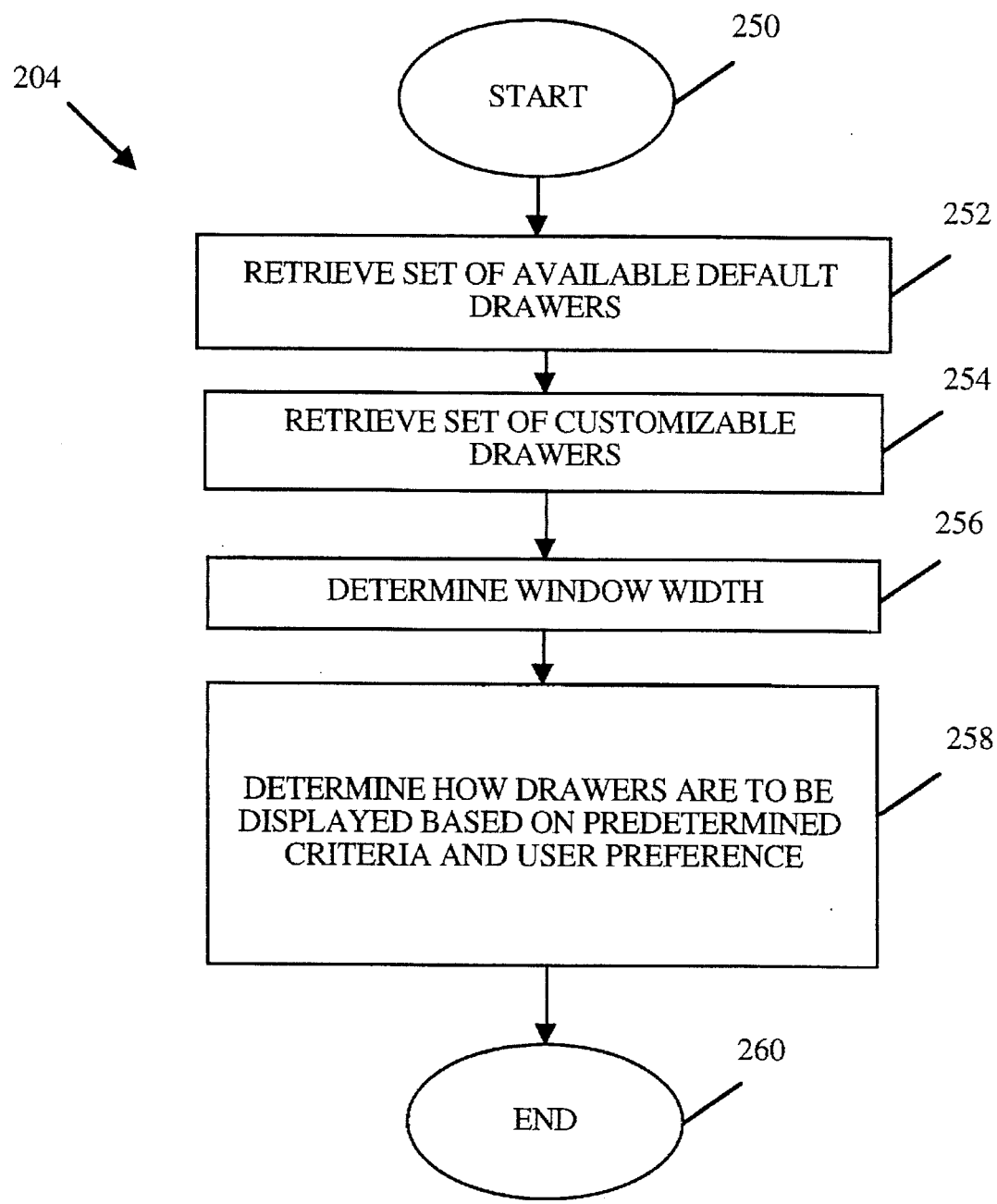
FIG. 7 shows in a simplified flowchart format the steps taken by the present invention to determine the available default drawers and the available customizable drawers.

FIG. 7 shows in greater detail in a simplified flowchart format the steps taken by the present invention to determine the available default drawers and the available customizable drawers. FIG. 7 is essentially a more detailed flowchart explaining step 204 of FIG. 6. FIG. 7 starts at step 250. At step 252, the program retrieves the set of default drawers from the application program. The set of default drawers may be predetermined by, for example, the manufacturer of the application software, the system administrator in a network or multi-user environment, or the user during installation. If the application window is activated for a pre-existing data set, it is preferable that any default drawer that existed when the data set was last saved takes precedence and be retrieved. In step 254, the program determines the set of customizable drawers that are available. Likewise, the available customizable drawers may be predetermined by the manufacturer, the system administrator, or the user beforehand. More preferably, the set of customizable drawers for a pre-existing data set are those customizable drawers that existed when the pre-existing data set was last saved. As discussed earlier, whether a default or a customizable drawer is available to any given user depends on the status of that user and other factors.

The program then proceeds to step 256 where it determines the width of the application window. Based upon the width of the application window determined in step 256, the program then proceeds to determine, in step 258, how the drawers are to be displayed based on any predetermined criteria and user preference. The predetermined criteria may be set by, for example, the manufacturer of the application software program. For example, the manufacturer of the application software program may specify that unless the user indicates otherwise, all drawer handles are to be displayed along the bottom edge of an application window in a stacked format. The user may also specify a user preference that preferably takes precedence over the criteria predetermined by the manufacturer of the application software. At any rate, after the program determines how the drawer handles are to be displayed in step 258, the steps of FIG. 7 end at step 260.

Figure 8:
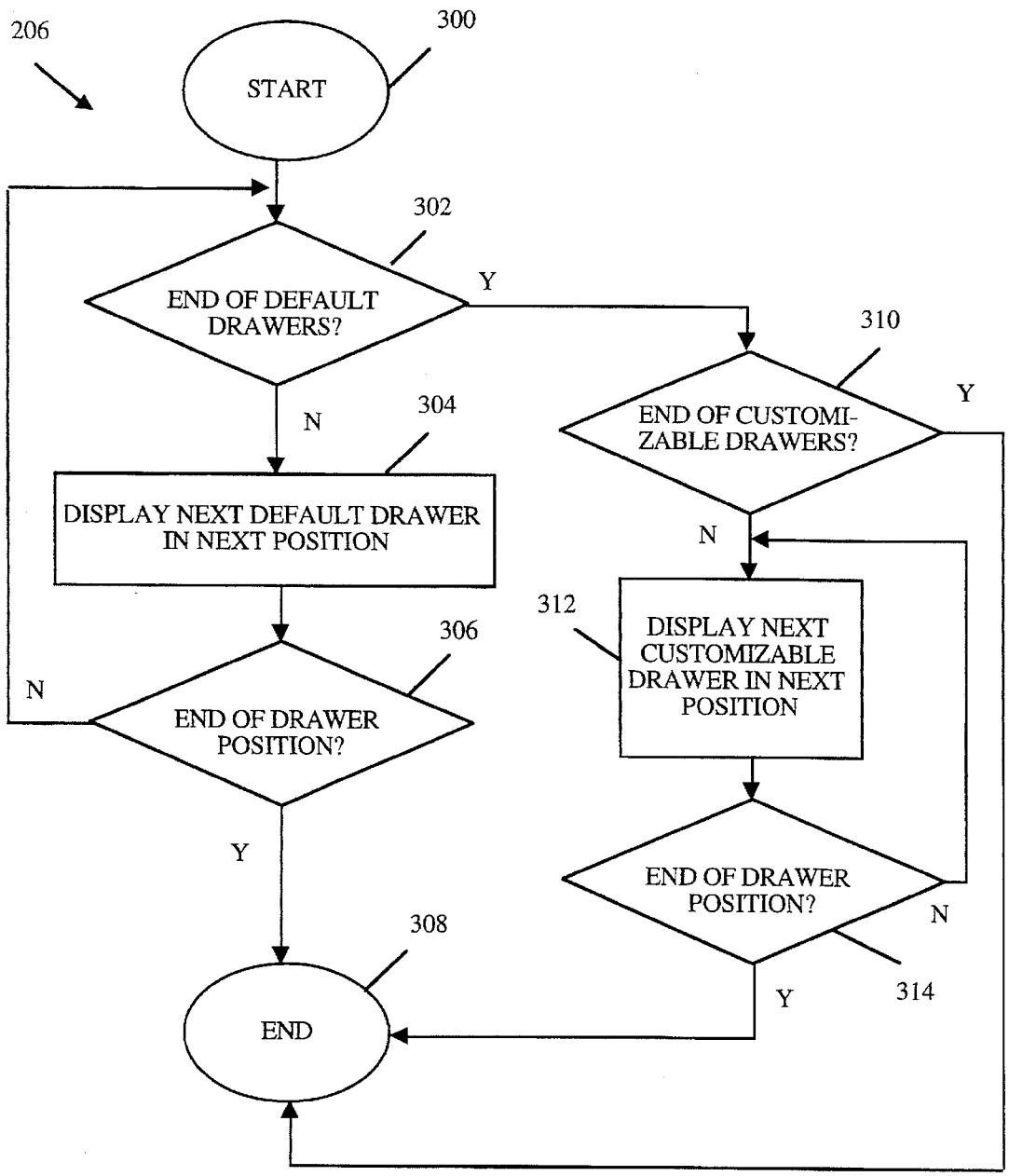
FIG. 8 shows in a simplified flowchart the steps taken by the present invention to open an application window displaying the available default drawers and the available customizable drawers.

FIG. 8 shows in greater detail in a simplified flowchart format the steps taken by the present invention to open an application window displaying the available default drawers and the available customizable drawers. FIG. 8 is essentially a more detailed flowchart explaining step 206 of FIG. 6. FIG. 8 starts at step 300. In step 302, the program checks to see whether all default drawers to be displayed as determined in step 204 of FIG. 6 have in fact been displayed. If all the available default drawers are not displayed, i.e. there are more available default drawers to be displayed, the program proceeds to step 304 where it displays the next available default drawer handle in the next available position in accordance to any predetermined criteria and/or user preference.

The program then proceeds to step 306 where it checks to see whether there is any available room, taking into account any predetermined criteria and/or user preference, in the application window to display additional drawer handles. As discussed, the predetermined criteria and/or user preference may include a stacked or scrolled format. If there is truly no more space left to display the drawer handles after taking into account the predetermined criteria and/or user preference, FIG. 8 ends at step 308 without displaying any more drawer handles. On the other hand, if there is additional space for additional drawer handles in the application window, the program returns to step 302 to keep checking whether there are any more available default drawer handles to be displayed.

Figure 9:
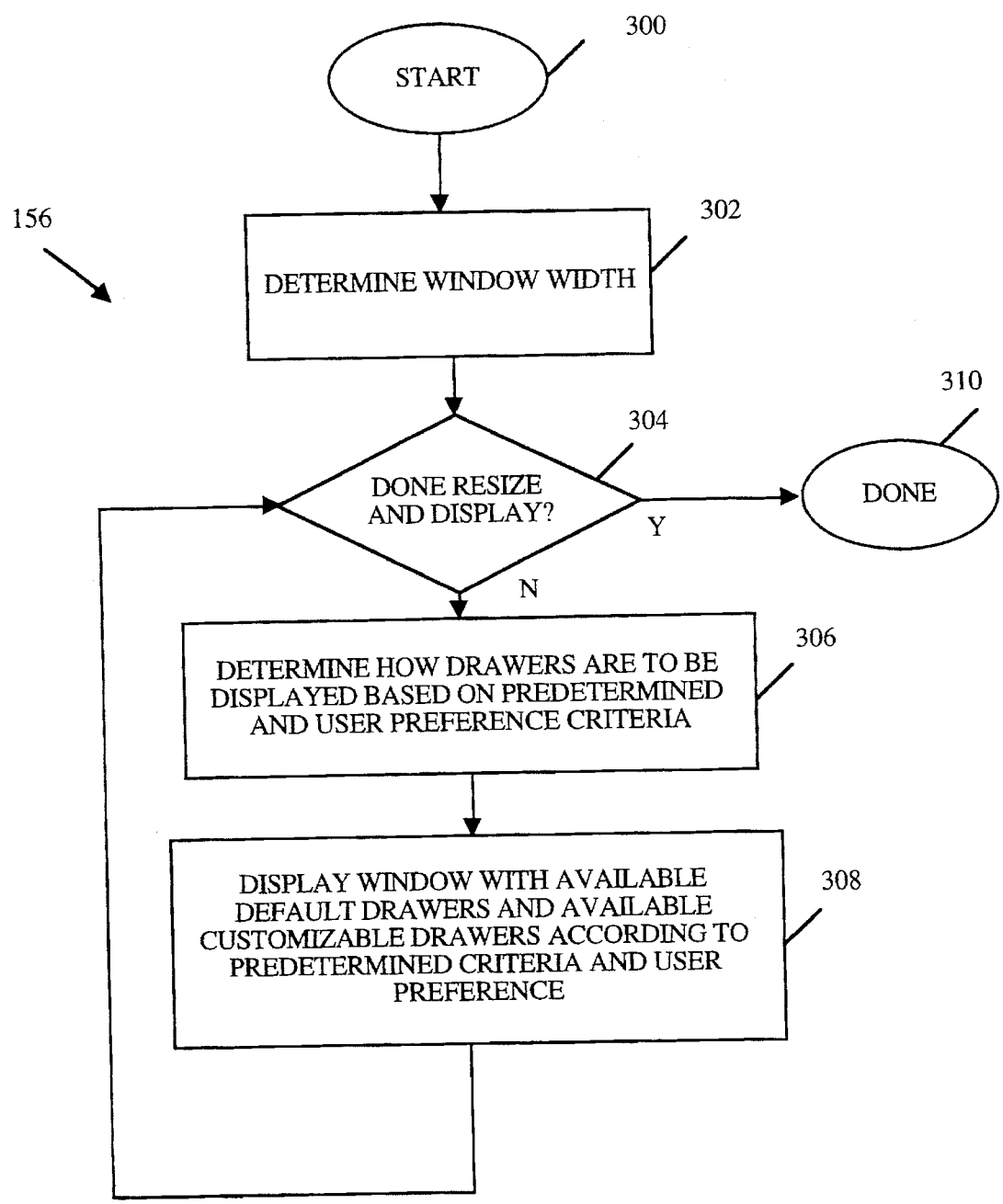
FIG. 9 shows in a simplified flowchart the steps taken by the present invention to display drawers as appropriate in an application window.

If there are no more available default drawer handles to be displayed, the program proceeds to step 310 to check whether there are any more available customizable drawers to be displayed. If there are no more available customizable drawers to be displayed in the application window, the steps of FIG. 8 end at step 308. On the other hand, if there are additional available customizable drawers to be displayed in the application window, the program proceeds to step 312 where it displays the next available customizable drawer handle in the next available position, taking into account the predetermined criteria and/or any user preference. The program then proceeds to step 314 where it checks to see whether there is any available space, taking into account any predetermined criteria and/or user preference, in which additional available drawer handles can be displayed. If there is truly no more space, the steps of FIG. 8 end at step 308. On the other hand, if there is more space, the program returns to step 312 to keep checking whether there are any more available customizable drawer handles to be displayed and display them if possible. FIG. 9 shows in greater detail in a simplified flowchart the steps taken by the present invention to display drawers as appropriate in an application window. FIG. 9 is essentially a more detailed flowchart explaining step 156 of FIG. 5. FIG. 9 starts at step 300. At step 302, the width of the application window is determined. Because the width of the application window may have been changed during the horizontal resize operation, a proper determination of the width of the application window permits the program to next determine how the available drawer handles can be displayed within the available space inside the application window. At step 304, the program checks to see whether all resize and display operations have been completed. If those operations are not completed, the program proceeds to step 306 to determine how the drawers are to be displayed based on any predetermined criteria and/or user preference. At step 308, the newly resized application window is displayed along with the available default drawers and the available customizable drawers according to any predetermined criteria and/or user preference. The program then returns to step 304 where it further checks to see whether the resize and display operations are completed. If those operations are completed, the program proceeds to step 310, concluding the steps of FIG. 9.

Figure 10A:
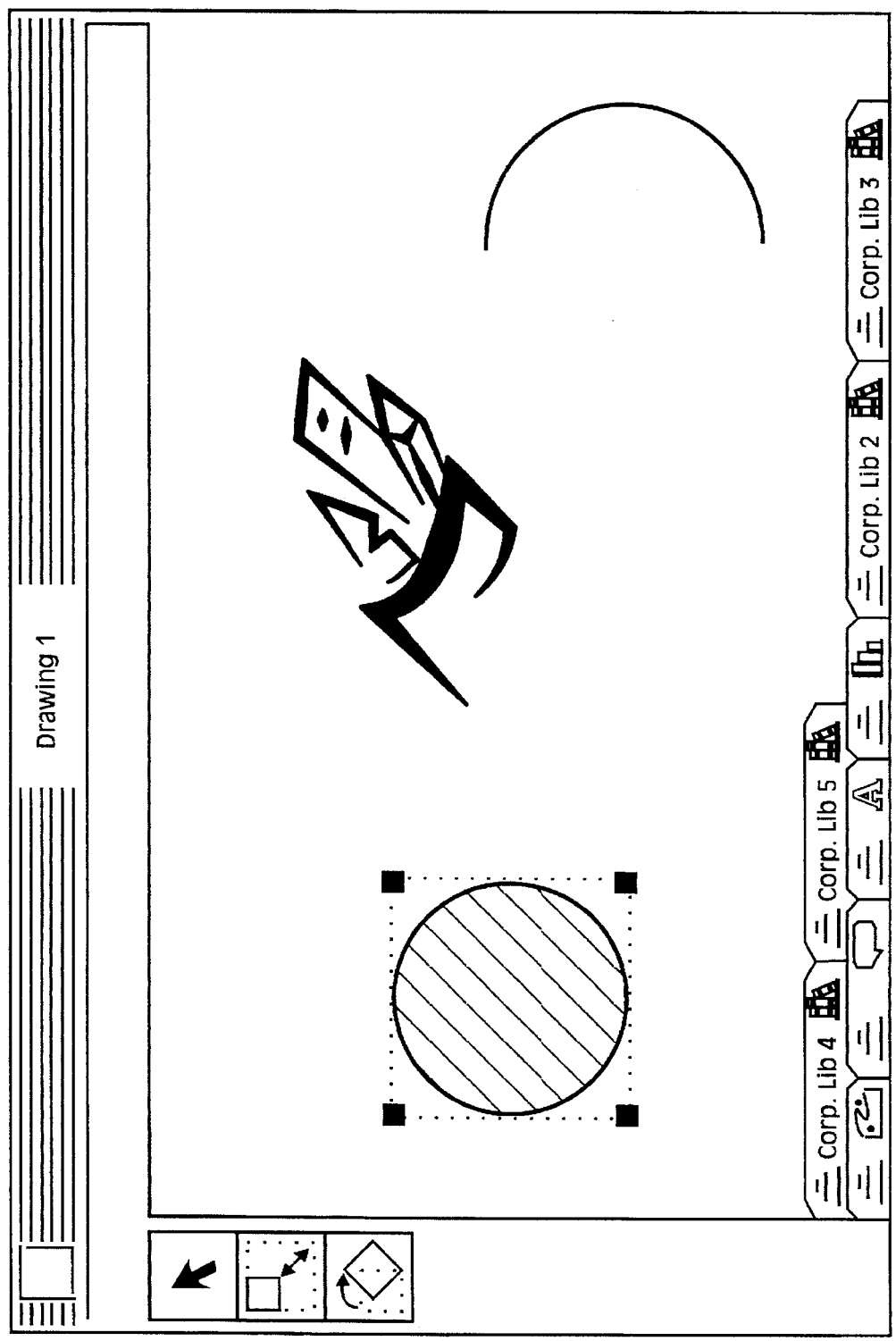
FIG. 10a shows a set of drawer handles displayed in a stacked format.
Figure 10B:
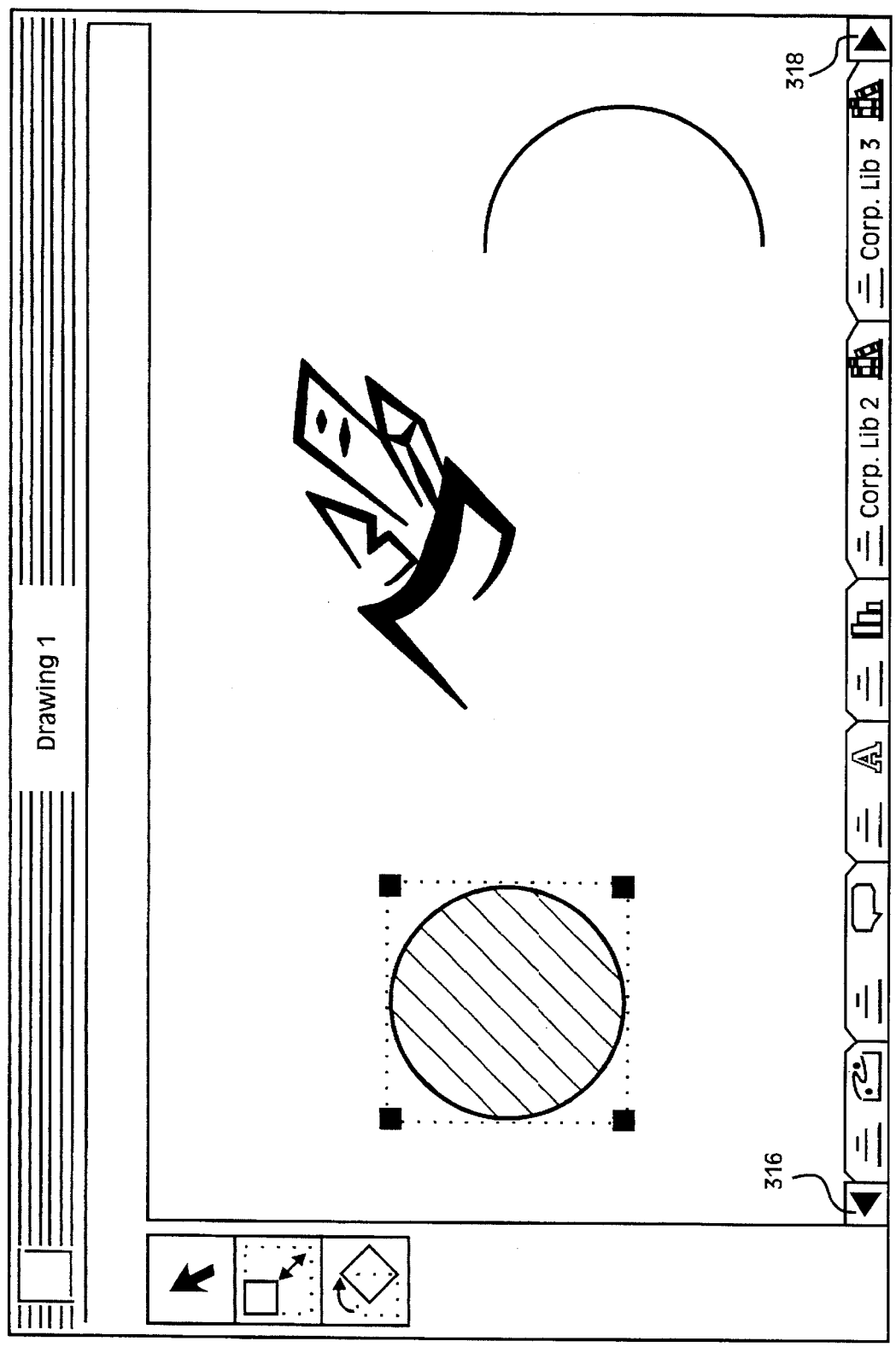
FIG. 10b shows a set of drawer handles arranged along the bottom edge of an application window, together with a scroll bar indicating the existence of additional available drawer handles.

FIGS. 10a–10b illustrate two methods, in addition to the standard row format of FIG. 4, for displaying drawer handles in the application window. FIG. 10a shows a set of drawer handles displayed in a stacked format. FIG. 10b shows a set of drawer handles arranged along the bottom edge of an application window, displayed together with a scroll bar having two scroll buttons 316 and 318, which serve to indicate to the user that additional drawer handles are available for access through scrolling.

Figure 11:
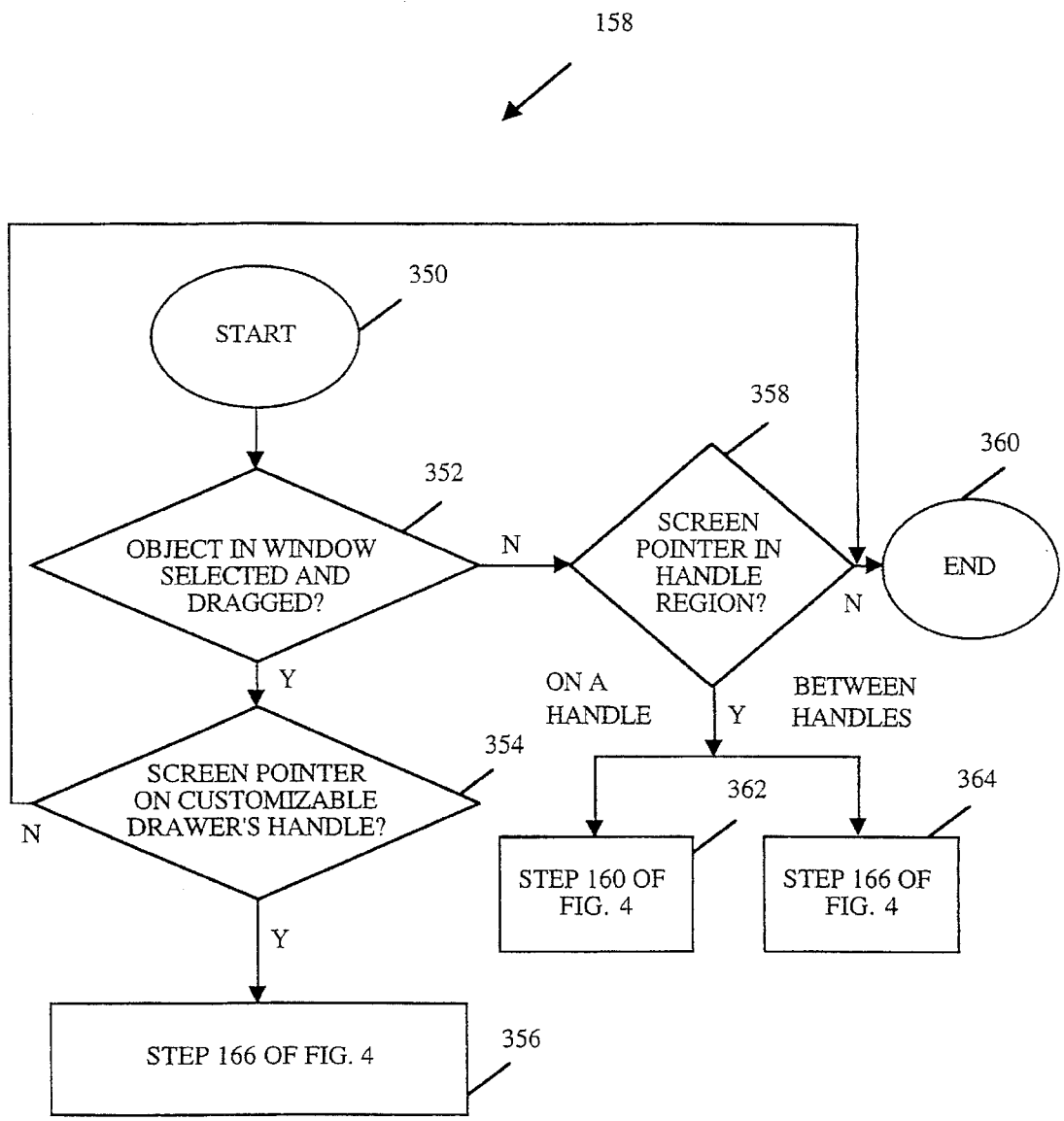
FIG. 11 shows in a simplified flowchart the steps taken by the present invention to determine the mode of drawer handle access.

FIG. 11 shows in greater detail in a simplified flowchart the steps taken by the present invention to determine the mode of drawer handle access. FIG. 11 is essentially a more detailed flowchart explaining step 158 of FIG. 5. FIG. 11 starts at step 350 as shown. The program proceeds to step 352 to determine whether handle access also involves a dragged object. If there is indeed an object dragged to the region occupied by the drawer handles, the program proceeds to step 354 where it further checks whether the screen pointer is currently placed on a drawer handle of a customizable drawer. If an object has been dragged on top of a customizable drawer handle, a deposit operation is assumed. In that case, the program proceeds to step 356 which, as shown in FIG. 11, represents step 166 of FIG. 5. On the other hand, if the drawer handle to which the user-deposited object is dragged is not a customizable drawer handle, the program proceeds to step 360 where the steps of FIG. 11 are concluded. In this situation, nothing happens because the user is not allowed to deposit an object into a default drawer. If desired, a visual or audible alarm may be activated to warn the user of the illegal attempt.

If it is determined in step 352 that an object has not been selected and dragged, the program proceeds to step 358 where it checks to see whether the screen pointer is within the region of the application window that is occupied by the drawer handles. If not, the steps of FIG. 11 end at step 360. On the other hand, if the screen pointer is placed in the region occupied by the drawer handles, the program makes one further check. If the screen pointer is on a drawer handle, regardless whether the drawer handle represents a default or a customizable drawer, the program assumes the user desires access to the drawer contents for manipulation of the stored objects. To provide access, the program proceeds to step 362 which, as shown in FIG. 11, represents step 160 of FIG. 5. On the other hand, if the screen pointer is in between drawer handles, the program assumes that the user desires to configure the drawer handles. In this case, the program proceeds to step 364, which, as shown in FIG. 11, represents step 166 of FIG. 5.

Figure 12A:
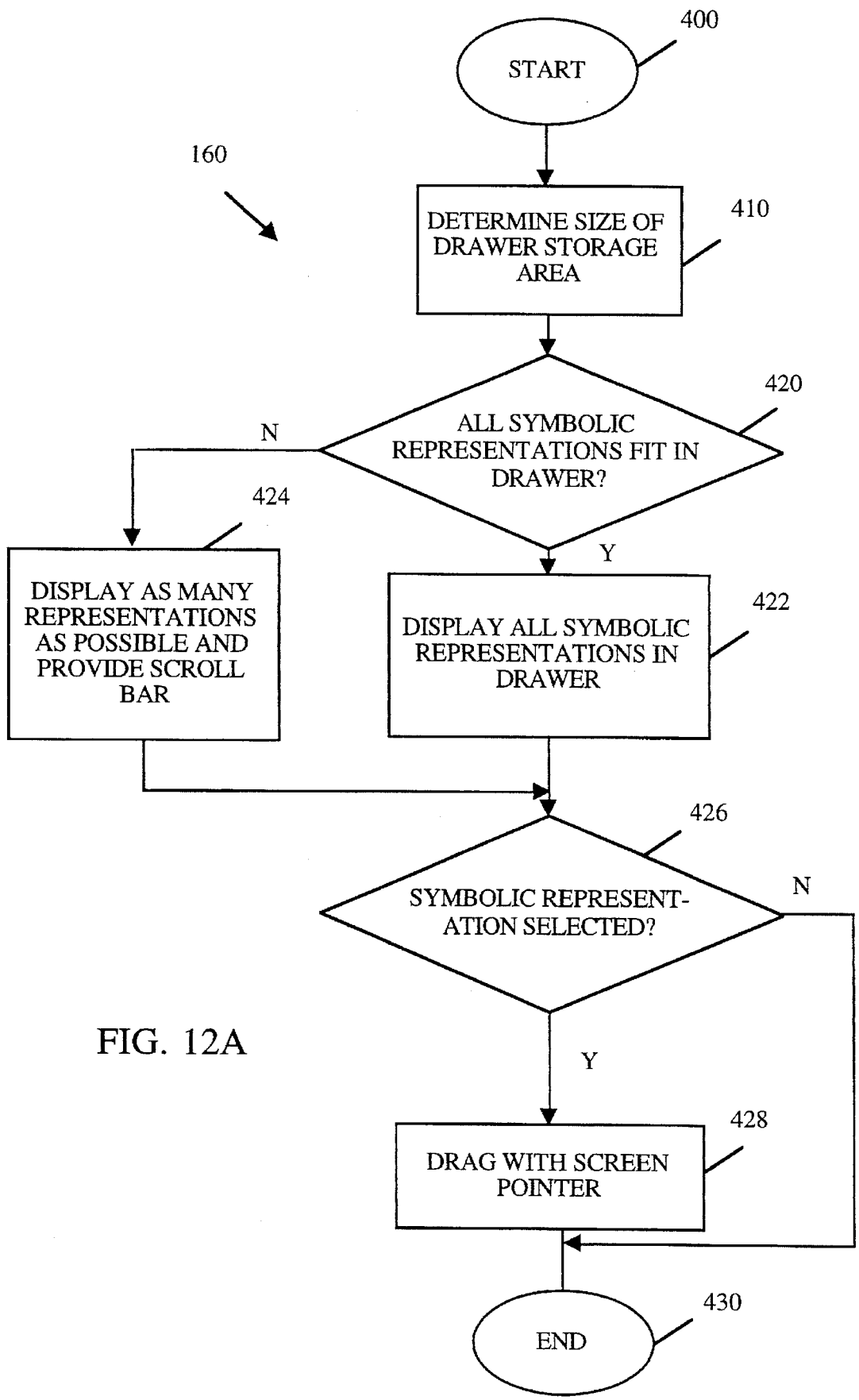
FIG. 12a shows in another simplified flowchart the steps taken by the present invention to open a drawer to show and manipulate objects.

FIG. 12a shows in greater detail in another simplified flowchart the steps taken by the present invention to open a drawer to show and manipulate objects. FIG. 12a is essentially a more detailed flowchart explaining step 160 of FIG. 5. FIG. 12a, starts at step 400. From step 400, the program proceeds to step 410 where it determines the size of the drawer storage area. As mentioned earlier, the width of the drawer handle, and consequently the width of the underlying drawer storage area, can be modified by the user. By properly determining the size of the drawer storage area, the program can determine in step 420 whether all symbolic representations would fit in the drawer storage area of the drawer accessed.

If all symbolic representations fit in the drawer storage area of the accessed drawer, the program proceeds to step 422 to display all symbolic representations in the drawer storage area. On the other hand, if all symbolic representations do not fit in the drawer storage area of the accessed drawer, the program proceeds to step 424 where it displays as many symbolic representations as possible. After filling up the drawer storage area with as many symbolic representations as fit, the program preferably provides a scroll bar to signify to the user that additional symbolic representations are available through scrolling. Alternatively, the program may expand the size of the drawer storage area, e.g. by lengthening it, to accommodate the additional symbolic representations.

The program next proceeds to step 426 where it determines whether a symbolic representation is selected for manipulation. Manipulation may include dragging the stored object or a copy of it out of the drawer for use in the application window display area. If the accessed drawer is a default drawer, only a copy of the stored object may be dragged outside the drawer for use since the contents of default drawers are unalterable. If the accessed drawer is a customizable drawer, the user may either drag a copy of the stored object from the open drawer and thereby leaving the original symbolic representation in the open drawer, or drag the symbolic representation representing the stored object itself out of the open drawer. If the latter operation is chosen, the open drawer no longer has stored in it the object being dragged out. As it is well known, the user and/or the application program may specify the specific input sequence via the pointing device and/or keyboard that defines respectively a selection operation or a copy operation.

In any event, if a symbolic representation within the open drawer is selected for dragging in step 426, the program proceeds to step 428 to drag the selected object with the screen pointer. As shown in FIG. 12a, the steps of FIG. 12a end at step 430.

Figure 12B:
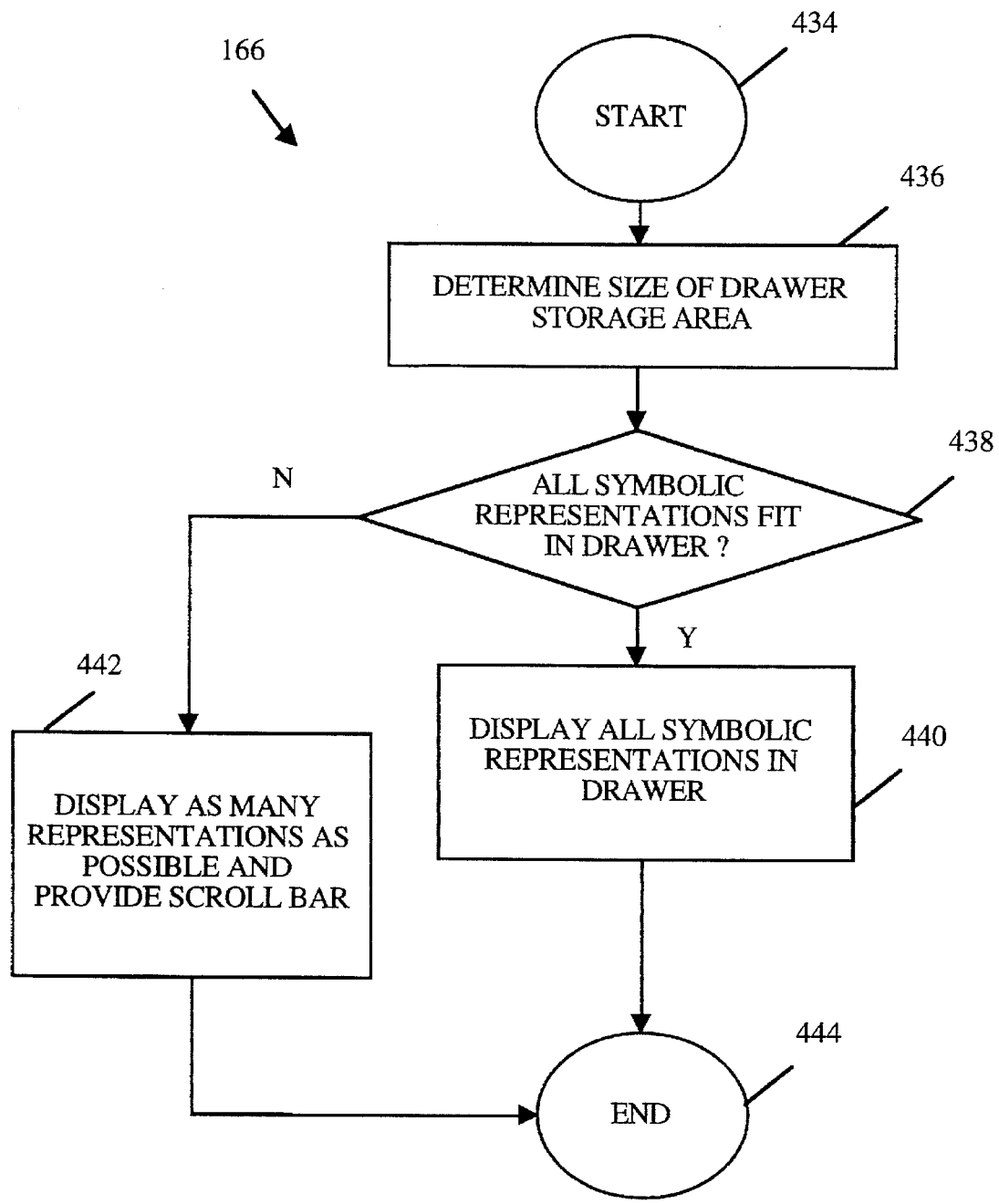
FIG. 12b shows in a simplified flowchart the steps taken by the present invention to open a customizable drawer to show objects.

FIG. 12b shows in greater detail in a simplified flowchart the steps taken by the present invention to open a customizable drawer to show objects. FIG. 12b is essentially a more detailed flowchart explaining step 166 of FIG. 5. FIG. 12b starts at step 434. The program proceeds to step 436 where it determines the size of the drawer storage area. In step 438, the program determines whether all symbolic representations would fit in the drawer storage area. If they do, the program proceeds to step 440 where it displays all symbolic representations. On the other hand, if all symbolic representations do not fit in the space available in the drawer storage area of the accessed drawer, the program proceeds to step 442 where it preferably displays as many symbolic representations as possible and provide a scroll bar to signify to the user that additional symbolic representations representing stored objects are available through scrolling. FIG. 12b ends at step 444.

Figure 13A:
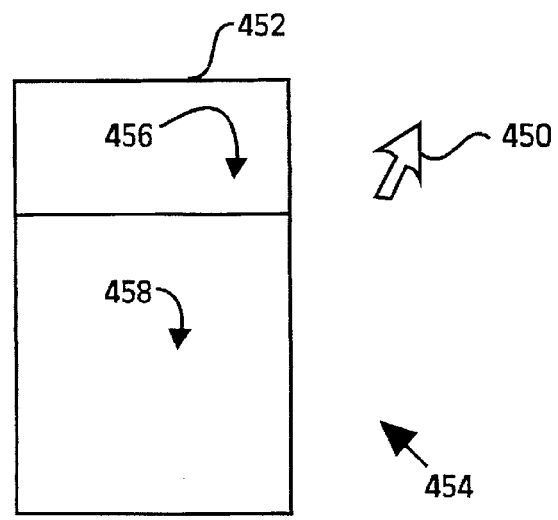
FIG. 13a shows a screen pointer being moved outside the boundary of an open drawer.
Figure 13B:
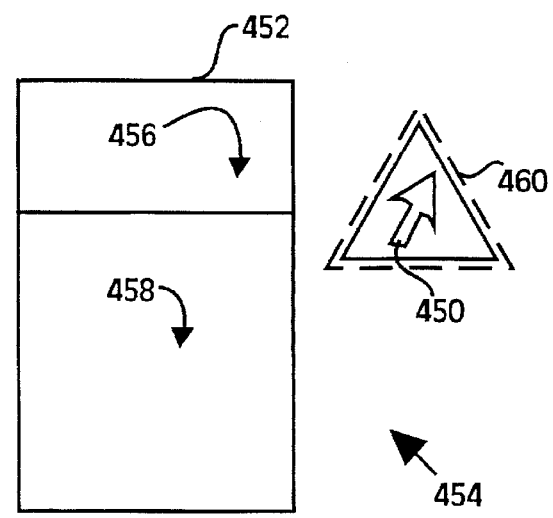
FIG. 13b shows a simplified outline of a stored object being dragged by a screen pointer outside the boundary of an open drawer.

If the screen pointer or the symbolic representation dragged by the screen pointer leaves the boundary of the open drawer, the program assumes that the user desires to leave the drawer and automatically closes the drawer as a result. In FIG. 13a, the boundary of a screen pointer 450 no longer overlaps a boundary 452 of an open drawer 454. In other words, there is no overlap between screen pointer 450 and either drawer handle 456 or drawer storage area 458 of open drawer 454. In FIG. 13b, the boundary of the symbolic representation dragged by screen pointer 450 does not overlap boundary 452 of open drawer 454. In the situation of either FIG. 13a or FIG. 13b, the program assumes that the user wants to leave the drawer and automatically closes the open drawer as a result.

Note that in FIG. 13b, it is preferably to use the boundary of symbolic representation 460, not the boundary of the stored object represented by symbolic representation 460, to determine whether the boundary of the open drawer is no longer overlapped and the open drawer should therefore be closed. This distinction is significant since the stored object represented by symbolic representation 460 may actually be many times larger than its symbolic representation 460. Using the boundary of the stored object to determine overlap may result in the drawer remaining open. In comparison, the drawer would close if the boundary of the symbolic representation is used instead to determine overlap.

Figure 14A:
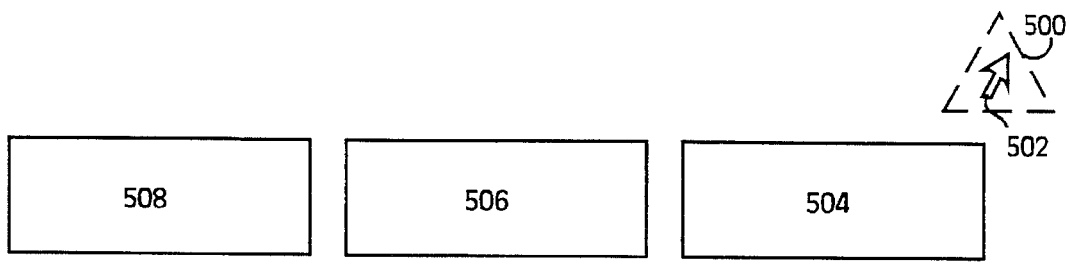
FIG. 14a shows a simplified outline of a stored object being dragged by a screen pointer toward a final position in a window display area.
Figure 14B:
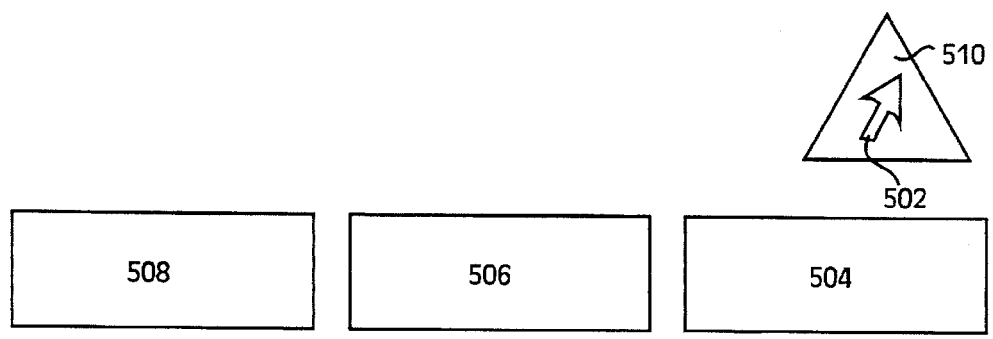
FIG. 14b shows the restored version of a stored object after the simplified outline of that stored object is dropped into the window display area.

After a symbolic representation is dragged out of an open drawer for use in the work space of the application window, certain object manipulations may remain to be performed. It is often the case that the object represented by the symbolic representation is larger or more complex than the symbolic representation itself. In such case, the actual object needs to be restored to its full size after the symbolic representation is dragged out of the drawer and dropped into the application window display area. FIG. 14a shows a simplified outline 500 of a stored object being dragged by screen pointer 502 toward a final position in the window display area. As mentioned earlier, the use of a simplified outline during a drag operation significantly improves efficiency by reducing the number of pixels that need to be updated along the drag path. Drawer handle 504, as well as drawer handles 506 and 508 are shown in the closed position. In FIG. 14b, the simplified outline is replaced by actual object 510 after it is dropped at a desired final position in the application window. The user can subsequently manipulate and otherwise make use of object 510 in the window display area.

Alternatively, the object may be restored to its original size immediately after its symbolic representation is dragged out of the drawer. The immediate restoration gives the user an accurate representation of the size/shape of the object to be placed in the application window display area and aids in the placement of the restored object. If the immediate restoration results in a much larger restored object and may inadvertently cause an overlap between the restored object and a drawer handle, the method preferably uses the smaller symbolic representation (now visually replaced by the restored object) instead of the restored object itself to determine whether access to a drawer is desired. In yet another embodiment, the method preferably does not open a drawer for access until the object dragged out of storage is dropped in the application window display area.

Figure 15A:
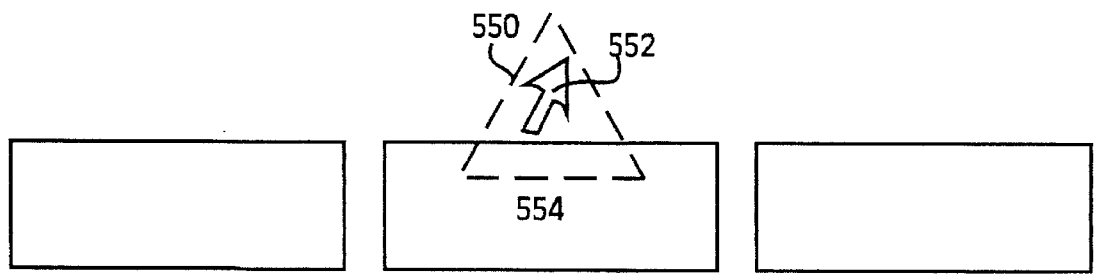
FIG. 15a shows a simplified outline of an object as it is being dragged over a customizable drawer handle for deposit.

FIG. 15a shows a simplified outline of an object as it is being dragged over a customizable drawer handle for deposit. In FIG. 15a, triangular graphical data object 510 of FIG. 14b is dragged by screen pointer 552 toward a customizable drawer 554 for storage. The triangular graphical data object 510 of FIG. 14b is represented by its simplified outline 550 in FIG. 15a.

Figure 15B:
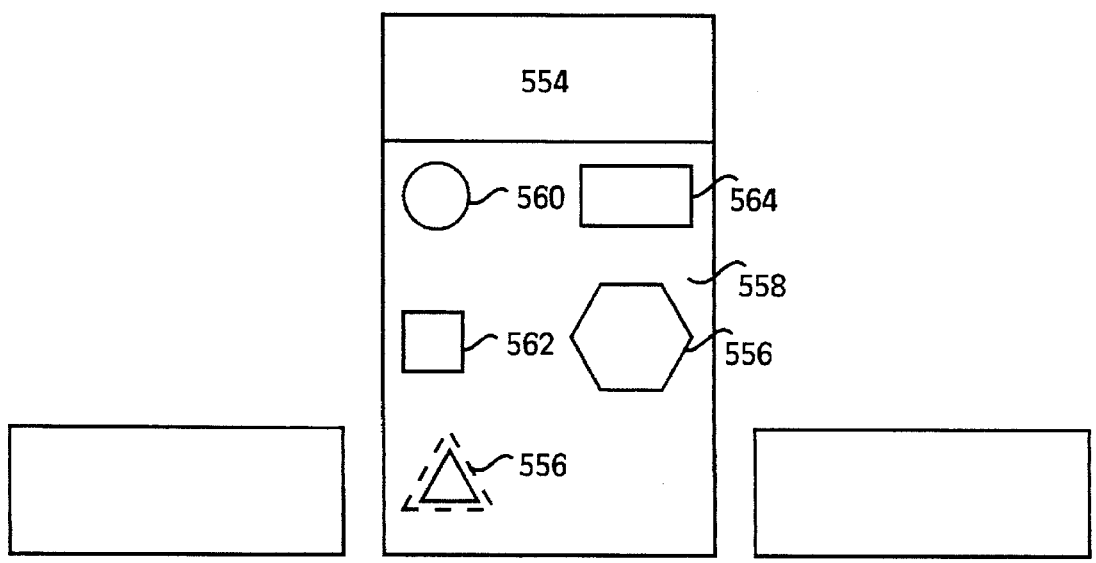
FIG. 15b shows a symbolic representation of the object dragged in FIG. 15a after that object is dropped into a customizable drawer for storage.

FIG. 15b shows a symbolic representation of triangular graphical data object 510 dragged in FIG. 15a after triangular graphical data object 510 is dropped into a customizable drawer for storage. In FIG. 15b, a symbolic representation 556 is shown. Symbolic representation 556 represents triangular graphical object 510 represented earlier by simplified outline 550 after simplified outline 550 was dragged into drawer storage area 558 and dropped. For illustration purposes, there is also shown in drawer storage area 558 a plurality of symbolic representations 560, 562, 564, and 566 which represent objects previously stored in drawer storage area 558.

Figure 16A:
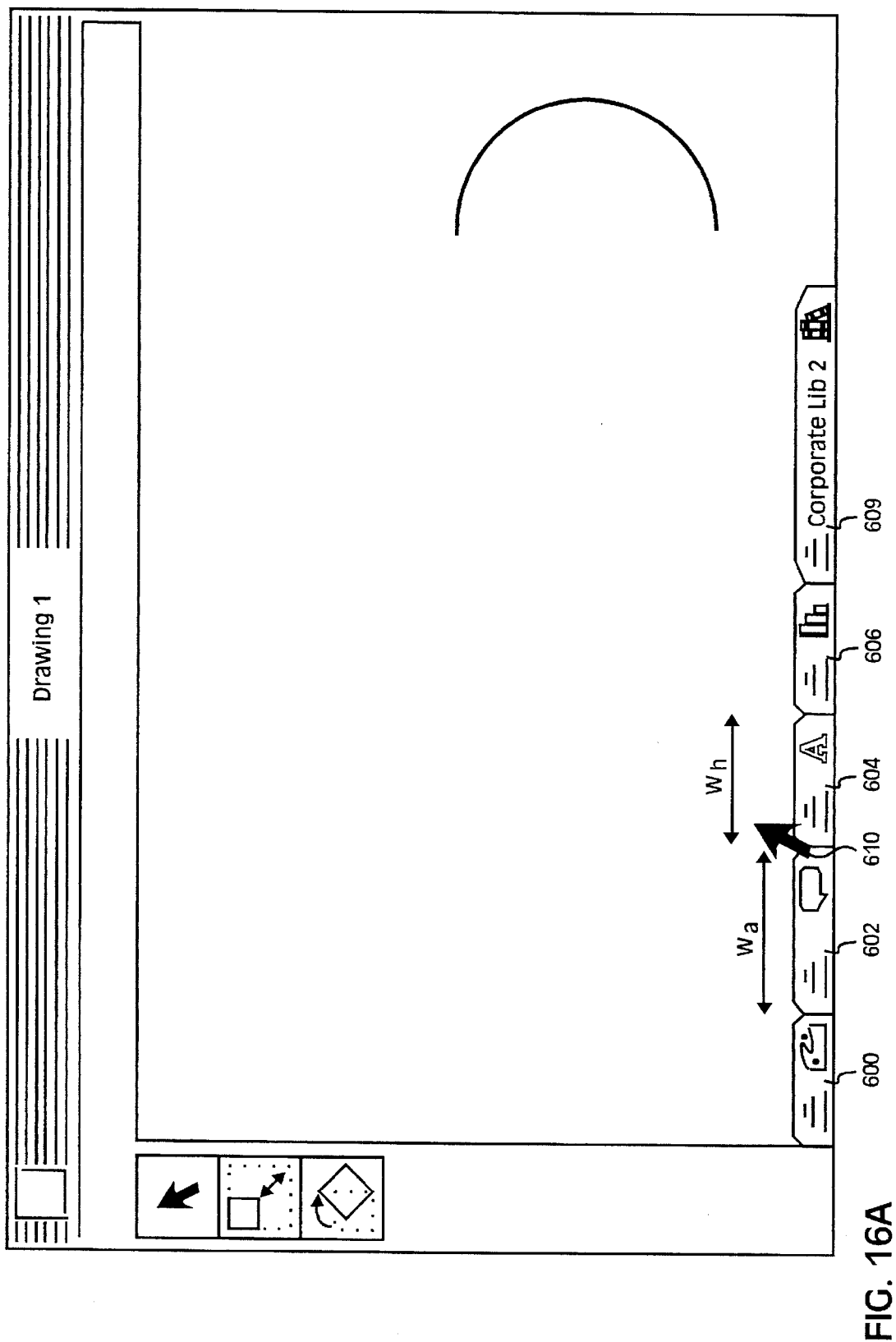
FIG. 16a shows a screen pointer located between two drawer handles to initiate drawer handle configuration.
Figure 16B:
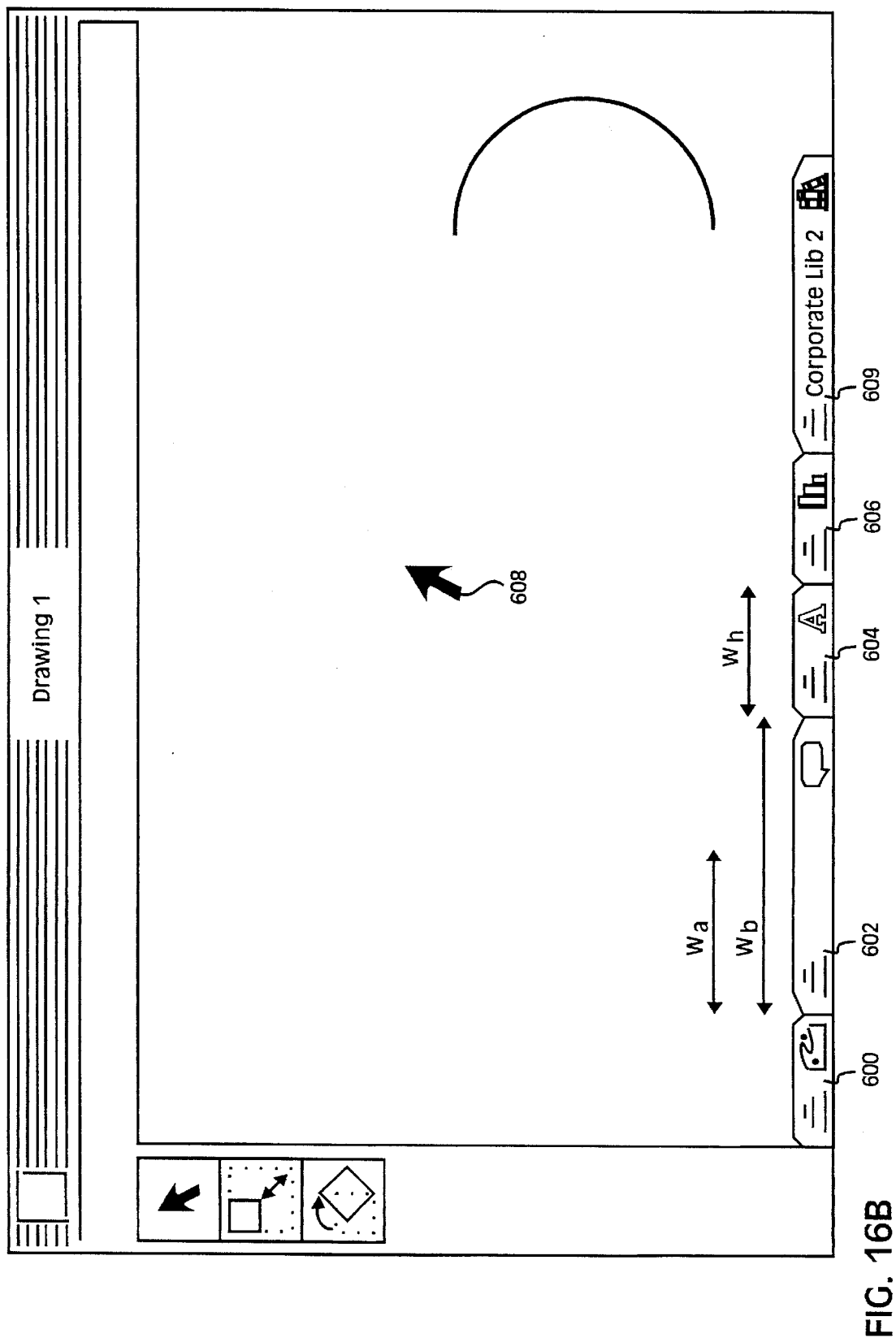
FIG. 16b shows the drawer handles of FIG. 16a after a drawer handle is expanded in size.
Figure 16C:
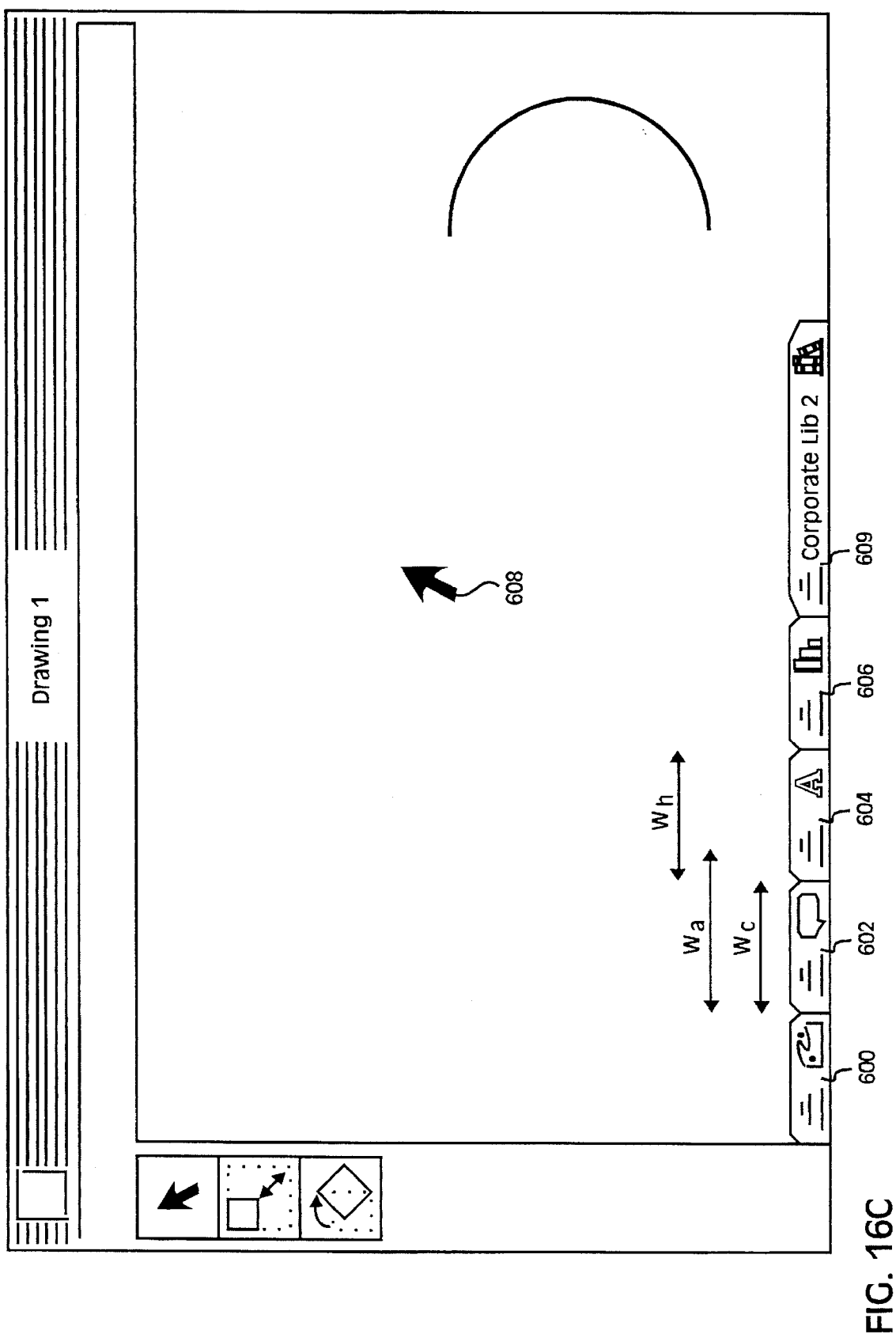
FIG. 16c shows the drawer handles of FIG. 16a after a drawer handle is shrunk in size.

FIGS. 16a–16c illustrate in a simplified format the process of drawer handle resizing. FIG. 16a shows a screen pointer located between two drawer handles to initiate drawer handle resizing. In FIG. 16a, there is shown a plurality of drawer handles 600, 602, 604, 606, and 609. There is also shown a screen pointer 608 placed in between drawer handles 602 and 604. Because screen pointer 608 is placed in the region generally occupied by the drawer handles, drawer handle access is assumed. Further, because screen pointer 608 is placed between two drawer handles, the program assumes the user wishes to resize drawer handles. Drawer handle 602 is shown to have a width of $w_a$ while drawer handle 604 is shown to have a width of $w_h$. When screen pointer 608 is placed in between two drawer handles as shown in FIG. 16a, the drawer handle to the left of the screen pointer is preferably assumed to be the drawer handle selected for the resize operation. Further, the drawer handle to the left of the screen pointer is preferably displayed in a different display mode to signify its selected status. Resizing can be accomplished by, for example, "grabbing" one edge of the selected drawer handle with the screen pointer and dragging that edge to achieve the desired width. For example, edge 610 of drawer handle 602 can be dragged to the right to widen the width of drawer handle 602.

FIG. 16b shows the drawer handles of FIG. 16a after drawer handle 602 is expanded in size. In FIG. 16b, a newly resized drawer handle 602 is shown. Newly resized drawer handle 602 has a width $w_b$ shown in FIG. 16b to be larger than its original width $w_a$. Because drawer handle 604 was not selected for reconfiguration, it retains its original width $w_h$. However, the drawer handles to the right of resized drawer handle 602, e.g. drawer handles 604, 606, and 609, are preferably shifted to the right to accommodate the newly resized and larger drawer handle 602. The location and width of the drawer handles to the left, e.g. drawer handle 600, preferably stay unchanged. FIG. 16b shows screen pointer 608 no longer being in the display region generally occupied by the drawer handles. Consequently, it is assumed that drawer handle access is no longer desired. Drawer handle 602 is preferably displayed in its normal display mode to signify that it is no longer "selected" for resizing.

FIG. 16c shows the drawer handles of FIG. 16a after a drawer handle is shrunk in size. In FIG. 16c, drawer handle 602 of FIG. 16a has been shrunk in size. Newly sized drawer handle 602 of FIG. 16c has a width $w_c$ which is shown to be less than original width $w_a$. The drawer handles to the right of resized drawer handle 602, e.g. drawer handles 604, 606, and 609, are preferably shifted to the left to accommodate the now smaller drawer handle 602. The location in size of the drawer handles to the left of the resized drawer handle 602, e.g. drawer handle 600, preferably stay unchanged.

Although the foregoing invention has been described in some detail for purposes of clarity of understanding, it will be apparent that certain changes and modifications may be practiced within the scope of the appended claims. For instance, it should be noted that although flowcharts are used herein to illustrate the inventive concepts, a program implementing the present invention is essentially event driven. In other words, the program responds to events when required rather than executing through the disclosed steps in a sequential fashion. Further, certain operation involving objects, their symbolic representations, and drawer handles have been described with reference to specific input operations such as selecting, highlighting, dragging, activating, and the like. It should be understood that these input operations are discussed herein with specificity merely to illustrate with consistency and clarity the operation of one embodiment of the inventive apparatus and method and that different input operations may be freely substituted without departing from the scope and spirits of the present invention.

As a further example, although the drawer handles of the present invention have been shown to be placed along the bottom edge of an application window, it is contemplated that drawer handles may be placed along the top edge and/or either or both of the vertical edges of an application window. Further, although many of the manipulation operations herein have been described with reference to a specific direction, e.g., horizontal or vertical, it should be understood that those directions are relative and may vary depending on the location of the drawer handles and the orientation of an application window in a display screen. As a further example, although the drawers of the described specific embodiment slides open into the window display area, it is within the scope of the present invention to reverse the direction of drawers' opening, thereby causing the drawers to open away from the window display area. This modification is highly advantageous in applications where the user does not wish to have open drawers inside the area occupied by the window display area.

For clarity, only one application window is shown herein. However, it should be understood that there may be a plurality of application windows, representing one or many different application programs, in a display screen at any given time, each of which may have its own set of drawers. Further, there may be a hierarchy of windows, each window in the hierarchy having its own set of associated drawers. Further, although the preferred embodiment makes use of the drawer's availability criteria and the user's authority level to determine whether a particular drawer can be associated with that user's data set, other well known methods of determining user access may be substituted, including methods using Boolean flags, passwords, and methods for controlling computer file access. Similarly, although the preferred embodiment makes use of the drawer's write-enable criteria and the user's authority level to determine whether a particular drawer is default or customizable from that user's perspective, other well known methods of determining user access may also be substituted, including the aforementioned methods using Boolean flags, passwords, as well as methods for controlling computer file access. Consequently, the scope of the invention is not limited to the specific examples given herein but is set forth in the appended claims.

What is claimed is:

1. An apparatus for storing objects for use with a data set in an application window on a digital computer, comprising:
   a drawer uniquely associated with said data set in said application window, said drawer capable of being displayed within said application window, comprising,
   a visible drawer handle having a first height and a first width, said visible drawer handle being configured for display in said application window, and
   a drawer storage area coupled to said visable drawer handle, wherein at least a portion of said drawer storage area is displayed with said application window when opened via said visible drawer handle by a user, said drawer storage area being visually coupled to said drawer handle when opened, and wherein said drawer storage area is capable of storing a plurality of objects, at least one of said plurality of objects being visually represented by a symbolic representation displayed within said drawer storage area when opened.

2. The apparatus of claim 1 wherein an association between said drawer and said data set is inhibitable based on a predetermined availability criteria.

3. The apparatus of claim 2 wherein said one of said plurality of objects is a user-deposited object, said user deposited object being an object chosen for storage by said user of said application window, one of said user-deposited object and a copy of said user-deposited object being later retrievable by a said user for use in said application window, and said drawer is a customizable drawer capable of storing said user-deposited object.

4. The apparatus of claim 3 wherein said customizable drawer automatically opens for access when said object chosen for storage is dragged over said visible drawer handle.

5. The apparatus of claim 4 wherein said customizable drawer automatically closes when the boundary of one of a screen pointer and said symbolic representation is moved outside a boundary area of said customizable drawer.

6. The apparatus of claim 4 wherein said customizable drawer automatically closes after said object chosen for storage is deposited in said customizable drawer of said application window.

7. The apparatus of claim 6 wherein the first width of said visible drawer handle is user-modifiable, and a second width of said drawer storage area correspondingly and automatically changes responsive to a modification of said first width of said visible drawer handle.

8. The apparatus of claim 6 further comprising a default drawer, said default drawer being uniquely associated with said data set in said application window, comprising, a visible default drawer handle configured for display within said application window, and a default drawer storage area coupled to said visible default drawer handle, wherein at least a portion of said default drawer storage area is displayed within said application window when opened via said visible default drawer handle, said default drawer storage area stores an unalterable number of default objects, a copy of said default object is retrievable from said default drawer storage area for use in said application window, at least one of said default objects being visually represented by a default symbolic representation displayed within said drawer storage area when opened.

9. The apparatus of claim 2 further comprising a plurality of other drawers, said plurality of other drawers, including said drawer associated with said data set, are displayed in said application window in a stacked format to maximize a window display area of said application window.

10. The apparatus of claim 2 further comprising a plurality of other drawers, said plurality of other drawers, including said drawer associated with said data set, are displayed in said application window in a scrolled format to maximize a window display area of said application window.

11. A method for storing objects in an application window in a digital computer, comprising:

providing a drawer for storing objects in a memory of said digital computer, said drawer being configured to be uniquely associated with a user data set in said application window, including providing a visible drawer handle having a first height and a first width, said visable drawer handle being configured for display in said application window; and providing a drawer storage area coupled to said visible drawer handle, wherein at least a portion of said drawer storage area is displayed within said application window when opened via said drawer handle by a user, said drawer storage area being visually coupled to said drawer handle when opened, and wherein said drawer storage area is capable of storing a plurality of objects, at least one of said plurality of objects being visually represented symbolic representation displayed within said drawer storage area when opened.

12. The method of claim 11 wherein said providing a drawer for storing objects further comprises:

providing said drawer in said memory of said digital computer; and providing an availability criteria for determining whether said drawer is associable with said user data set responsive to said user's authority level.

13. The method of claim 12 wherein said providing a drawer for storing objects further comprises providing a write-enable level for determining whether said drawer is customizable or default with respect to a particular user.

14. The method of claim 11 wherein said objects are user-deposited objects chosen for storage by said user of said application window and said drawer is a customizable drawer.

15. The method of claim 11 further comprising:

providing a default drawer in said memory of said digital computer, said default drawer storing a plurality of default objects and capable of being uniquely associated with said user data set in said application window, including providing a visible default drawer handle, said visible default drawer handle being configured for display in said application window; and providing a default drawer storage area coupled to said visible default drawer handle, wherein at least a portion of said default drawer storage area is displayed within said application window when opened via said default drawer handle by said user, and at least one of said default objects being visually represented by a symbolic representation displayed within said default drawer storage area when opened.

16. The method of claim 15 further comprising displaying a plurality of drawers, including said customizable drawer and said default drawers, in a stacked format in said application window in said digital computer.

17. The method of claim 16 further comprising displaying a plurality of drawers, including said customizable drawer and said default drawers, in a scrolled format in said application window in said digital computer.

18. An apparatus for storing default objects and user-deposited objects for use with a user data set in an application window in a digital computer, comprising:

a default drawer uniquely associable with said user data set in said application window, including:

a visible default drawer handle having a first height and a first width displayed in a window display area of said application window;

an availability criteria for determining whether said default drawer can be associated with said user data set; and a default drawer storage area coupled to said visible default drawer handle, wherein at least a portion of said default drawer storage area is displayed within said application window when opened via said visible default drawer handle by said user, said default drawer storage area being visually coupled to said visible default drawer handle when opened, said default drawer storage area stores a plurality of unalterable default objects, at least one of said unalterable default objects being represented by a first symbolic representation displayed within said default drawer storage area when opened; and a customizable drawer uniquely associated with said user data set in said application program, including:

a visible customizable drawer handle displayed in a window display area of said application window; and a customizable drawer storage area coupled to said visible customizable drawer handle, wherein at least a majority portion of said customizable drawer storage area is displayed within said application window when opened by said user via said visible customizable drawer handle, said customizable drawer storage area stores for storing a plurality of user-deposited objects, at least one of said user-deposited objects being represented upon access by a second symbolic representation displayed within said customizable drawer storage area when opened.

* * * * *

UNITED STATES PATENT AND TRADEMARK OFFICE
CERTIFICATE OF CORRECTION

PATENT NO. : 5,664,128

DATED : September 2, 1997

INVENTOR(S) : German Wolfgang Bauer

It is certified that error appears in the above-identified patent and that said Letters Patent is hereby corrected as shown below:

In the claims:

Claim 1, Column 22, line 66, please delete "with" and insert - -within- -.

Claim 8, Column 23, line 54, please insert after "drawer" the word - -uniquely- -.

Claim 8, Column 23, line 59, please insert after "drawer" the word - -uniquely- -.

Claim 12, Column 24, line 16, please insert after "comprises" - -the steps of- -.

Claim 17, Column 24, line 53, please insert after "comprising" - -the step of- -.

Signed and Sealed this

Third Day of August, 1999

Attest:

Q. TODD DICKINSON

*Attesting Officer*  *Acting Commissioner of Patents and Trademarks*